(12) United States Patent
Izumi

(10) Patent No.: US 6,449,070 B1
(45) Date of Patent: Sep. 10, 2002

(54) OPTICAL TRANSMISSION DEVICE AND WAVELENGTH-MULTIPLEXED OPTICAL TRANSMISSION SYSTEM

(75) Inventor: Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/237,904

(22) Filed: Jan. 27, 1999

(30) Foreign Application Priority Data

Feb. 16, 1998 (JP) .......................................... 10-032954

(51) Int. Cl.[7] .............................................. H04J 14/02
(52) U.S. Cl. ..................... 359/124; 359/110; 359/337
(58) Field of Search ............................. 359/110, 124, 359/337

(56) References Cited

U.S. PATENT DOCUMENTS 5,841,558 A * 11/1998 Tamura et al. ............... 359/124
6,055,082 A * 4/2000 Chikuma ..................... 359/161

FOREIGN PATENT DOCUMENTS

| JP | 58-200642 | 11/1983 |
| JP | 2-270036 | 11/1990 |
| JP | 6-153248 | 5/1994 |
| JP | 7-154368 | 6/1995 |

* cited by examiner

Primary Examiner—Kinfe-Michael Negash
(74) Attorney, Agent, or Firm—Staas & Halsey LLP

(57) ABSTRACT

An optical transmission device that can be applied to a wavelength-multiplexed optical transmission system includes a first part creating a supervisory control signal to be transmitted in optical formation together with an optical main signal, the supervisory control signal comprising a vector of elements respectively corresponding to wavelengths. The device further includes a second part converting a vector included in a supervisory control signal received from a remote optical transmission device into another vector by a process using a path matrix in the vector received forms diagonal elements of the path matrix, the above another vector being transmitted to a next stage in the wavelength-multiplexed optical transmission system.

25 Claims, 18 Drawing Sheets

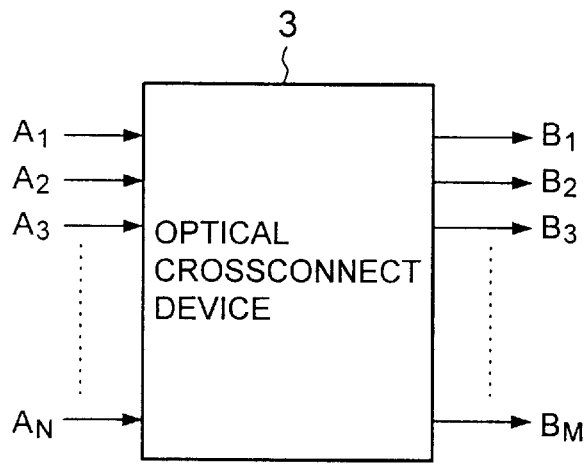
FIG.3A
FIG.3B
$$\begin{pmatrix} \lambda_1 & 0 & 0 & 0 & \cdots\cdots & 0 \\ 0 & \lambda_2 & & & & 0 \\ 0 & & \lambda_3 & & & 0 \\ 0 & & & \lambda_4 & & \\ & & & & \ddots & 0 \\ 0 & 0 & 0 & \cdots\cdots & 0 & \lambda_n \end{pmatrix}$$
FIG.3C
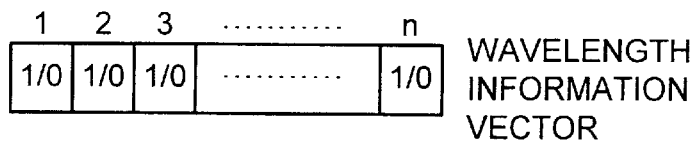
WAVELENGTH INFORMATION VECTOR FIG.4A
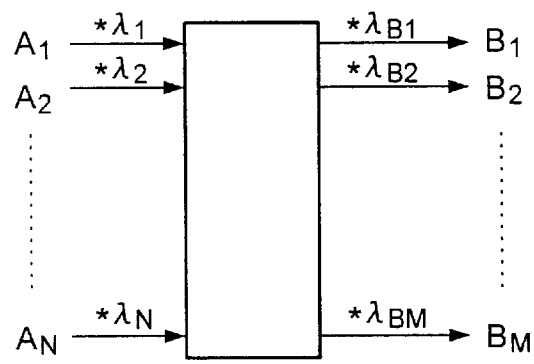
FIG.4B
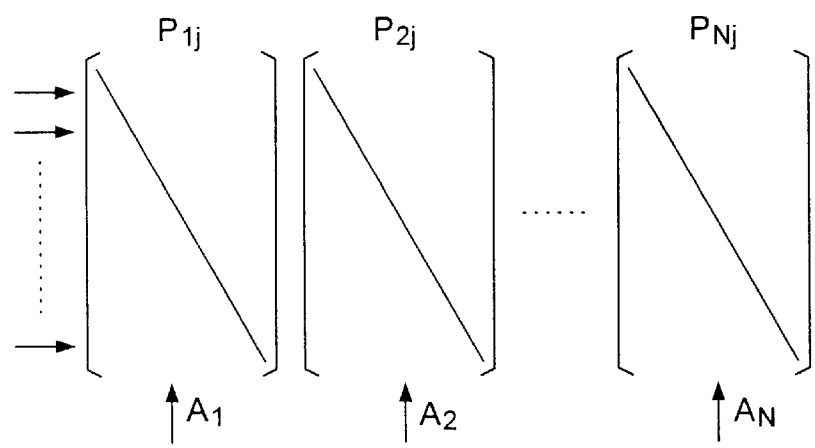
FIG.4C
$$\begin{bmatrix} *\lambda_{B1} \\ *\lambda_{B2} \\ \vdots \\ *\lambda_{BM} \end{bmatrix} = \sum_{j=1}^{M} \sum_{i=1}^{N} P_{ij} * \lambda_i * e_j$$

FIG.11A

| C/R | WAVELENGTH RETRIEVING VECTOR STORING FIELD | REPEATER/TERMINAL DEVICE ID STORING FIELD |
|---|---|---|

FIG.11B

| C/R | COUNTER | WAVELENGTH RETRIEVING VECTOR STORING FIELD | REPEATER/TERMINAL DEVICE ID STORING FIELD |
|---|---|---|---|

FIG.11C

| MODE | C/R | COUNTER | WAVELENGTH RETRIEVING VECTOR/ WAVELENGTH INFORMATION VECTOR STORING FIELD | REPEATER/TERMINAL DEVICE ID/RECEIVED-STATE VECTOR STORING FIELD |
|---|---|---|---|---|

FIG.11D

| F | AIS | DCC | E1L | OWC | MODE | C/R | CODE 1 | VECTOR 1 | CODE 2 | VECTOR 2 | COUNTER | ID |
|---|---|---|---|---|---|---|---|---|---|---|---|---|

FIG.17

| OPERATION MODE | CONTENTS | MODE | C/R | VECTOR 1 / CODE 1 | VECTOR 2 / CODE 2 | COUNTER | ID |
|---|---|---|---|---|---|---|---|
| NORMAL | CREATE | XXXX0000 | 1 | WAVELENGTH INFORMATION VECTOR | RECEIVED-STATE VECTOR | XXXX | XX····X |
| | CREATE, TRANSFER | | 1 | WAVELENGTH INFORMATION VECTOR | RECEIVED-STATE VECTOR | XXXX | XX····X |
| | RESPONSE | | — | | | — | — |
| | TRANSFER RESPONSE | | — | | | — | — |
| PATH RETRIEVAL | CREATE | %XX00001 | 1 | RETRIEVAL OBJECT WAVELENGTH VECTOR | | 0000 | XX····X |
| | CREATE, TRANSFER | %XX=0XX INHIBITTED | 1 | VECTOR AFTER PATH MATRIX CONVERSION | RECEIVED VALUE | RECEIVED VALUE +1 | RECEIVED VALUE |
| | RESPONSE | | 0 | RETRIEVAL OBJECT WAVELENGTH VECTOR | RECEIVED RETRIEVAL OBJECT WAVELENGTH VECTOR | RECEIVED VALUE | DEVICE OWN ID |
| | TRANSFER RESPONSE | | 0 | RECEIVED VALUE | RECEIVED VALUE | RECEIVED VALUE | RECEIVED VALUE |
| ROUTE RETRIEVAL 1 (NO SWITCHING) | CREATE | %XX00010 | 1 | RETRIEVAL OBJECT WAVELENGTH VECTOR | | 0000 | XX····X |
| | CREATE, TRANSFER | %XX=0XX INHIBITTED | 1 | VECTOR AFTER PATH MATRIX CONVERSION | RECEIVED VALUE | RECEIVED VALUE +1 | RECEIVED VALUE |
| | RESPONSE | | 0 | RETRIEVAL OBJECT WAVELENGTH VECTOR | RECEIVED RETRIEVAL OBJECT WAVELENGTH VECTOR | RECEIVED VALUE | DEVICE OWN ID (DEVICE OWN ID) |
| | TRANSFER RESPONSE | | 0 | RECEIVED VALUE | RECEIVED VALUE | | RECEIVED VALUE |
| ROUTE RETRIEVAL 2 (SWITCHING IS PERFORMED) | CREATE | %XX10010 | 1 | RETRIEVAL OBJECT WAVELENGTH VECTOR | | 0000 | DESTINATION ID |
| | CREATE, TRANSFER | %XX=0XX INHIBITTED | 1 | VECTOR AFTER PATH MATRIX CONVERSION | RECEIVED VALUE | RECEIVED VALUE +1 | RECEIVED VALUE |
| | RESPONSE | | 0 | RETRIEVAL OBJECT WAVELENGTH VECTOR | RECEIVED RETRIEVAL OBJECT WAVELENGTH VECTOR | RECEIVED VALUE | DEVICE OWN ID (DEVICE OWN ID) |
| | TRANSFER RESPONSE | | 0 | RECEIVED VALUE | RECEIVED VALUE | | RECEIVED VALUE |

FIG.18

| OPERATION MODE | CONTENTS | MODE | C/R | CODE 1 | VECTOR 1 | CODE 2 | VECTOR 2 | COUNTER | ID |
|---|---|---|---|---|---|---|---|---|---|
| FLAG RESET | CREATE | %XXX0011 | 1 | | WAVELENGTH INFORMATION VECTOR | | RECEIVED-STATE VECTOR | XXXX | XX····X |
| | CREATE, TRANSFER | | 1 | | WAVELENGTH INFORMATION VECTOR | | RECEIVED-STATE VECTOR | XXXX | XX····X |
| | RESPONSE | | — | | | | | — | — |
| | TRANSFER RESPONSE | | — | | | | | — | — |
| SETTING OF NETWORK/ END | CREATE | %XXX0100 | 1 | | WAVELENGTH INFORMATION VECTOR | | RECEIVED-STATE VECTOR | XXXX | DEVICE OWN ID |
| | CREATE, TRANSFER | %XXX0000 | 1 | | WAVELENGTH INFORMATION VECTOR | | RECEIVED-STATE VECTOR | XXXX | XX····X |
| | RESPONSE | %XXX0100 | 0 | | WAVELENGTH INFORMATION VECTOR | | RECEIVED-STATE VECTOR | XXXX | DEVICE OWN ID |
| | TRANSFER RESPONSE | %XXX0000 | 0 | | WAVELENGTH INFORMATION VECTOR | | RECEIVED-STATE VECTOR | XXXX | XX····X |
| RETRIEVAL REQUEST | CREATE | %XXX0101 | 1 | | WAVELENGTH INFORMATION VECTOR | | RECEIVED-STATE VECTOR | XXXX | DEVICE OWN ID |
| | CREATE, TRANSFER | | 1 | | WAVELENGTH INFORMATION VECTOR | | RECEIVED-STATE VECTOR | XXXX | RECEIVED VALUE |
| | RESPONSE | | 0 | | WAVELENGTH INFORMATION VECTOR | | RECEIVED-STATE VECTOR | $$$$ | RECEIVED VALUE |
| | TRANSFER RESPONSE | | 0 | | WAVELENGTH INFORMATION VECTOR | | RECEIVED-STATE VECTOR | RECEIVED VALUE | RECEIVED VALUE |
| NOTIFICATION OF RECEPTION | CREATE | %X1X0110 | 1 | | XX····X | | XX····X | XXXX | DEVICE OWN ID |
| | CREATE, TRANSFER | | 1 | | XX····X | | XX····X | XXXX | RECEIVED VALUE |
| NOTIFICATION OF COMPLETION | CREATE | %X1X0111 | 1 | | SET VALUE | | SET VALUE | 1111 | DEVICE OWN ID |
| | CREATE, TRANSFER | | 1 | | RECEIVED VALUE | | RECEIVED VALUE | 1111 | RECEIVED VALUE |

FIG. 19

| OPERATION MODE | CONTENTS | MODE | C/R | CODE 1 | VECTOR 1 | CODE 2 | VECTOR 2 | COUNTER | ID |
|---|---|---|---|---|---|---|---|---|---|
| ADVANCE NOTIFICATION | CREATE | %XXX1000 | 1 | | | | | XXXX | DEVICE OWN ID |
| | CREATE, TRANSFER | | 1 | | | XX····X | XX····X | XXXX | RECEIVED VALUE |
| | RESPONSE | | 0 | | | XX····X | XX····X | $$$$ | DEVICE OWN ID |
| | TRANSFER RESPONSE | | 0 | RECEIVED VALUE | | XX····X | XX····X | $$$$ | RECEIVED VALUE |
| NOTIFICATION OF MASTER | CREATE | %XXXXXXX | X | XX····X | XX····X | XX····X | XX····X | XXXX | XX····X |
| | CREATE, TRANSFER | | X | XX····X | XX····X | XX····X | XX····X | XXXX | XX····X |
| NOTIFICATION OF ERROR | CREATE | %1XXXXXX | X | XX····X | XX····X | XX····X | XX····X | XXXX | XX····X |
| | CREATE, TRANSFER | | X | XX····X | XX····X | XX····X | XX····X | XXXX | XX····X |
| REQUEST TO CONFIRM RECEPTION | CREATE | %X#XXXXX | X | XX····X | XX····X | XX····X | XX····X | XXXX | XX····X |
| | CREATE, TRANSFER | | X | XX····X | XX····X | XX····X | XX····X | XXXX | XX····X |
| ADM RELEASE | CREATE | %XX#XXXX | X | XX····X | XX····X | XX····X | XX····X | XXXX | XX····X |
| | CREATE, TRANSFER | | X | XX····X | XX····X | XX····X | XX····X | XXXX | XX····X |

OPTICAL TRANSMISSION DEVICE AND WAVELENGTH-MULTIPLEXED OPTICAL TRANSMISSION SYSTEM

BACKGROUND OF THE INVENTION

1. Field of the Invention

The present invention relates to a wavelength-multiplexed optical transmission system in which optical signals having different wavelengths are multiplexed and transmitted, and more particularly to an optical transmission device applicable to such a system.

A wavelength-multiplexed optical transmission system is known as a large-capacity transmission system. The wavelength-multiplexed optical transmission system includes terminal equipment or devices receiving and transmitting optical signals, optical cross-connect devices, add/drop devices and optical amplifiers. The optical cross-connect devices perform an add and drop operation on an optical signal and a wavelength interchanging operation. The wavelength-multiplexed transmission system is required to avoid collision of optical signals having the same wavelength and to manage wavelengths used.

2. Description of the Related Art

FIG. 1 schematically illustrates a wavelength-multiplexed optical transmission system.

The system includes terminal devices 201 and 202, an optical cross-connect device 203, an optical amplifier 204, and optical transmission paths 205. The terminal devices 201 and 202 multiplex optical signals of wavelengths $\lambda 1$–$\lambda n$, and transmit and receive multiplexed optical signals. The optical cross-connect device 203 is equipped with the functions of setting cross-connects from incoming paths to outgoing paths and performing the add/drop operation on the optical signals. The function of setting the cross-connects include a wavelength conversion of optical signals. The cross-connect device 203 can add or drop an optical signal having a wavelength$\lambda x$. Although only one optical cross-connect device 203 is illustrated in FIG. 1, a plurality of optical cross-connect devices can be connected in accordance with the size of the network. An ADM (Add/Drop Module) may be used in which an optical filter is utilized to drop and add optical signals.

The optical amplifier 204 is provided in the optical cross-connect device 203 or in a repeater provided in the optical transmission paths 205 at given intervals. The optical amplifier 204 amplifies the wavelength-multiplexed optical signal as per se. For example, the optical amplifier 204 employs a rare-earth doped optical fiber, which receives a received optical signal and an exciting (pumping) light, so that the received optical signal can be amplified. The level of the amplified optical output signal can be controlled by controlling the power of the exciting light.

Generally, the optical amplifier 205 is controlled by an automatic level control (ALC) so as to obtain a constant optical output level. The automatic level control controls a current that flows in a semiconductor laser generating the exciting light. If the optical signal having a certain wavelength contained in the wavelength-multiplexed optical signal is broken, the optical signals of wavelengths other than the above certain wavelength are excessively amplified in order to obtain the constant optical output level. Hence, there is an increased possibility that the interference between the wavelengths may be increased or error in receipt due to level variations in the respective wavelengths on the receive side may be increased. In contrast, when an increased number of wavelengths is used, the levels for the wavelengths that are already used are decreased in order to maintain the optical output level at constant.

With the above in mind, the wavelength-multiplexed optical signal is demultiplexed into the respective optical signals, and monitors such as photodiodes are provided to the respective wavelengths. The monitors are used to determine whether the respective wavelengths are now in use. Hence, it is possible to determine whether each of the optical signals having the respective wavelengths has been broken down. Further, it is possible to detect a situation in which an optical signal of another wavelength is started to be used. The number of wavelengths that are in use can be obtained and thus the automatic level control of the optical amplifier 205 can be performed based on the number of wavelengths that are in use.

The optical signals are modulated by using frequencies respectively provided to the wavelengths thereof, and are multiplexed before transmission. The optical amplifier 205 is equipped with a monitor converting an optical signal into an electric signal, and filters respectively provided to the modulation frequencies. The optical signals are detected by the filters in order to detect the breakdown of an optical signal and an event in which an optical signal is started-to be used. Hence, the automatic level control of the optical amplifier 205 can be performed based on the number of wavelengths that are in use.

When the system is started to operate, the terminal devices 201 and 202 inform the optical amplifier 205 of the number of wavelengths to be used by means of control information. The optical amplifier 205 performs the automatic level control based on the number of wavelengths to be used. A method has been proposed in which if there is a wavelength which is started to be used or stopped while the system is working, the optical amplifier 205 is informed of the presence of the above wavelength by the control information. Hence, the optical amplifier 205 receives the control information and performs the automatic level control based on a change of the number of wavelengths.

However, the prior art described above has the following disadvantages. In the case where the optical amplifier 205 employs the automatic level control using the monitors for the respective wavelengths, as an increased number of wavelengths is used, the optical amplifier 205 has an increased circuit size. This increases the cost. In the case where the optical amplifier 205 employs the filters, only one monitor is required to convert the optical signal into the electric signal. However, the optical amplifier 205 requires the filters equal in number to the frequencies for modulation. This increases the circuit size and the production cost.

The arrangement is less expensive in which the terminal devices 201 and 202 inform the optical amplifier 205 of the number of wavelengths to be used by the control information. However, the optical amplifier 205 is required to have the functions of receiving and discriminating the control information, identifying the wavelengths that are in use by means of software, and performing the automatic level control based on the number of wavelengths that are in use. However, a considerable long time is required to execute the software process. Further, it is difficult to automatically change the levels at the same time as the number of wavelengths is changed. Hence, the level of the received level may instantaneously be increased or decreased. Such an abrupt change in the level of the optical signal may increasingly cause a burst error on the reception side.

In the wavelength-multiplexed optical transmission system including the optical cross-connect device 203, a plurality of terminal devices are mutually connected via the cross-connect device 203. Hence, it is difficult to inform all the optical amplifiers 205 of the number of wavelengths that are in use. Particularly, the arrangement of the optical cross-connect devices 203 performing the wavelength change and route switching makes it possible to ensure the stable automatic level control of the optical amplifiers 205. If the wavelength-multiplexed optical transmission system has an increased scale and a complex configuration, different terminal devices may use optical signals of the same wavelength. In such a case, the optical signals collide with each other, and the normal transmission is no longer ensured.

In the wavelength-multiplexed optical transmission system having a plurality of terminal devices, optical signals of the same wavelength may collide with each other in the optical cross-connect device or the like. In order to avoid the above collision, all the terminal devices are asked to determine whether a newly used wavelength collides with the existing optical signals. As the system size is increased, it is very difficult to search for an available wavelength.

SUMMARY OF THE INVENTION

It is a general object of the present invention to provide an optical transmission device suitable for a wavelength-multiplexed optical transmission system in which the above disadvantages are eliminated.

A more specific object of the present invention is to easily manage and notify of information concerning the wavelengths which are used and to easily control optical amplifiers and search for transmission routes.

The above objects of the present invention are achieved by An optical transmission device that can be applied to a wavelength-multiplexed optical transmission system, the optical transmission device comprising: a first part creating a supervisory control signal to be transmitted in optical formation together with an optical main signal, the supervisory control signal comprising a vector of elements respectively corresponding to wavelengths; and a second part converting a vector included in a supervisory control signal received from a remote optical transmission device into another vector by a process using a path matrix in the vector received forms diagonal elements of the path matrix, the above another vector being transmitted to a next stage in the wavelength-multiplexed optical transmission system.

The optical transmission device may further comprise a third part which transmits a wavelength information vector indicating that the number of wavelengths used is zero to a next stage in the wavelength-multiplexed optical transmission system, when the supervisory control signal and the main signal are broken down.

The optical transmission device may be configured so that: the vector is a wavelength information vector which indicates the number of wavelengths used in the main signal; and at least one of the optical transmission devices comprises a third part which determines whether there is a collision of wavelengths used by referring to wavelength information vectors received from a plurality of routes.

The optical transmission device may further comprise a third part which returns the supervisory control signal including a received-state vector indicating wavelengths which are normally received to a transmission side which transmits the vector created by the first part.

The optical transmission device may further comprise a third part which returns, to a transmission side which transmits the vector created by the first part, when receipt of an optical signal from any one of routes to which an optical signal of an identical wavelength branches is confirmed, the supervisory control signal including a received-state vector formed by performing an OR operation on received-state vectors received from the routes.

The optical transmission device may further comprise a third part which returns, to a transmission side which transmits the vector created by the first part, when receipt of optical signals from all routes to which an optical signal of an identical wavelength branches is confirmed, the supervisory control signal including a received-state vector formed by performing an AND operation on received-state vectors received from the routes.

The optical transmission device may further comprise a third part which comparing the vector serving as a wavelength information vector indicating wavelengths used with a received-state vector indicating wavelengths normally received and identifying a fault from a mismatch between corresponding elements in the wavelength information vector and the received-stage vector.

The optical transmission device may further comprise an optical transmission device which transmits a wavelength retrieving vector for retrieving a wavelength usable by using the supervisory control signal and returns a retrieval result indicating a retrieved usable wavelength and a device ID by using the supervisory control signal.

The optical transmission device may be configured so that the optical transmission devices transmits a wavelength retrieving vector for retrieving a wavelength usable by using the supervisory control signal and returns a retrieval result indicating a retrieved usable wavelength, a device ID and a counter value indicating an order of receipt of the wavelength retrieving vector by using the supervisory control signal.

The optical transmission device may further comprise a receiving direction memory part which stores a direction in which a wavelength retrieving vector indicating a usable wavelength is received, and a direction in which a response is received, the response being sent in receipt of a newly created wavelength information vector from the wavelength retrieving vector and the wavelength information vector which vectors are received.

The optical transmission device may further comprise: a receiving direction memory part which stores a direction in which a wavelength retrieving vector indicating a usable wavelength is received, and a direction in which a response is received, the response being sent in receipt of a newly created wavelength information vector from the wavelength retrieving vector and the wavelength information vector which vectors are received; and a part which resets the receiving direction memory part after the optical transmission device is controlled to use the usable wavelength in accordance with a route switching instruction.

The optical transmission device may further comprise a third part which sends, by the supervisory control signal, a wavelength retrieving vector for retrieving a usable wavelength, and a route switching instruction indicating whether the usable wavelength should be used by switching.

The optical transmission device may further comprise a third part which performs setting of a network side or a terminal side on the basis of a magnitude of a value of a device ID of an opposing optical transmission device at the time of establishing a data link for sending and receiving the supervisory optical transmission signal.

Another object of the present invention is to provide an optical amplifier which can be applied to a wavelength-multiplexed optical transmission system having an optical transmission device comprising: a first part creating a supervisory control signal to be transmitted in optical formation together with an optical main signal, the supervisory control signal comprising a vector of elements respectively corresponding to wavelengths; and a second part converting a vector included in a supervisory control signal received from a remote optical transmission device into another vector by a process using a path matrix in the vector received forms diagonal elements of the path matrix, the above another vector being transmitted to a next stage in the wavelength-multiplexed optical transmission system, the optical transmission, the optical amplifier comprises: a first part which directly amplifies the optical signal; the vector included in the supervisory control signal is a wavelength information vector indicating wavelengths used in the main signal; and the optical amplifier performs an automatic level control based on the number of wavelengths indicated by the wavelength information vector.

The optical amplifier may be configured so that the optical amplifier performs the automatic level control so that, when only the supervisory control signal is broken down, the automatic level control is based on a number of wavelengths used immediately before the supervisory control signal is broken down.

The optical amplifier may be configured so that the optical amplifier performs the automatic level control so that, when the supervisory control signal and the main signal are broken down, the automatic level control is based on a condition in which the number of wavelengths used in the main signal is equal to zero.

The optical amplifier may be configured so that it comprises a part which gradually controls an output level based on an increase or decrease in the number of wavelengths used in response to a notification indicating such an increase or decrease and returns the output level to an original level based on the number of wavelengths used before the increase or decrease when a fault occurs while gradually controlling the output level and the optical amplifier is notified of the fault by the supervisory control signal.

A further object of the present invention is to provide a wavelength-multiplexed optical transmission system comprising: a plurality of optical transmission devices, each of the optical transmission devices comprising: a first part creating a supervisory control signal to be transmitted in optical formation together with an optical main signal, the supervisory control signal comprising a vector of elements respectively corresponding to wavelengths; and a second part converting a vector included in a supervisory control signal received from a remote optical transmission device into another vector by a process using a path matrix in the vector received forms diagonal elements of the path matrix, the above another vector being transmitted to a next stage in the wavelength-multiplexed optical transmission system.

The wavelength-multiplexed optical transmission system may be configured so that: one of the optical transmission devices serves as a master station, and remaining optical transmission devices serve as slave stations; a path retrieval or a route retrieval using the wavelength retrieving vector is carried out by the master station or one of the slave stations which is allowed to perform the path retrieval or the route retrieval by the master station; and one of the slave stations is set to a new master station if a fault occurs in the master station.

BRIEF DESCRIPTION OF THE DRAWINGS

Other objects, features and advantages of the present invention will become more apparent from the following detailed description when read in conjunction with the accompanying drawings, in which:

FIGS. 3A, 3B and 3C are diagrams of a path matrix;

FIGS. 4A, 4B and 4C are diagrams illustrating a process using the path matrix;

FIGS. 11A, 11B, 11C and 11D show formats of a supervisory control signal according to an embodiment of the present invention;

FIG. 17 is a diagram illustrating a relationship between operation modes and supervisory control signals;

FIG. 18 is a diagram illustrating another relationship between the operation modes and the supervisory control signals; and FIG. 19 is a diagram illustrating yet another relationship between the operation modes and the supervisory control signals.

DESCRIPTION OF THE PREFERRED EMBODIMENTS

Figure 2:
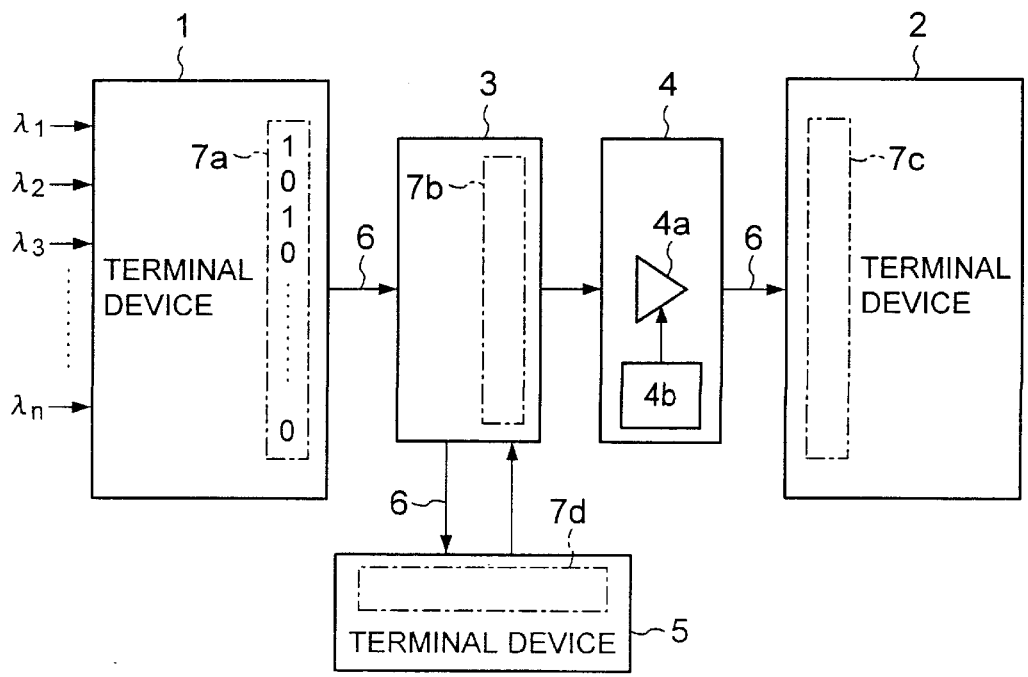
FIG. 2 is a block diagram of a wavelength-multiplexed optical transmission system according to an embodiment of the present invention.

FIG. 2 shows the principle of a wavelength-multiplexed optical transmission system of the present invention. The system includes terminal devices 1, 2 and 5, an optical cross-connect device 3, and optical transmission devices such as an add/drop device and a repeater. A vector is used in which a plurality of wavelengths correspond to bits that form a bit train. Each of the bits is set to "1" when the respective wavelength is in use, and is set to "0" when the respective wavelength is not used. Such a vector is specifically called wavelength information vector. In FIG. 2, there are illustrated wavelength information vectors 7a, 7b, 7c and 7d. The wavelength information vectors 7a–7d are transmitted by a supervisory control signal that is an optical signal. The number of bits "1" contained in each of the bit trains indicates the number of wavelengths that are now in use. Hence, the optical amplifiers can be controlled by means of a hardware process. Further, wavelength information vectors can easily be created by a process using a path matrix in which the vectors are diagonal elements. Hence, it is possible to easily detect a collision which occurs when the identical wavelengths are used.

If a failure occurs in only the supervisory control signal which transfers the wavelength information vector, the optical amplifiers are controlled in accordance with the information indicative of the number of wavelengths available just before the failure occurs. If a failure occurs in not only the supervisory control signal but also the main signal, the number of wavelengths is set to zero, and the control of the optical amplifiers is stopped, in other words, the optical amplifiers are caused to stop operating. All the bits of the wavelength information vector with respect to the downstream-side devices are set to zero.

A reception state vector indicative of received wavelengths is transmitted to the terminal device on the transmission side from the terminal device on the reception side. Then, the terminal device on the transmission side determines whether the signals have normally been received on the wavelength basis. The cross-connect device and the ADM device are designed to return the reception state vector to the terminal device on the transmission side. Hence, it is possible to determine, on the wavelength base, whether the signals have duly been received by the cross-connect device and the ADM device. A wavelength retrieving vector for searching for an available wavelength is transmitted along with a command. When receiving a response indicating an idle wavelength, the terminal device on the transmission side searches for an available wavelength for transmission. When the wavelength retrieving vector including a route switching instruction is transmitted and a wavelength is available, the optical cross-connect device and the ADM device change the wavelength to the retrieved-wavelength.

At the time of establishing a data link, a selective setting for selecting the network side or the terminal side is carried out by transmitting and receiving a device ID. Hence, it is possible to perform the network/end setting in a network having complicated connection arrangements.

A further description will be given of the wavelength-multiplexed optical transmission system shown in FIG. 2.

The terminal devices 1, 2 and 5 has a configuration of receiving and transmitting wavelength-multiplexed optical signals. The optical cross-connect device 3 has the functions of setting incoming and outgoing routes, converting the wavelengths and adding and dropping optical signals.

The optical amplifier 4 includes an optical amplifier part 4a including a rare-earth doped optical fiber such as, an erbium-doped optical fiber, and an optical amplification control part 4b. The optical amplification control part 4b adds, by means of hardware, bits "1" in the bit train forming the wavelength information vector included the supervisory control signal, and thus obtains the number of bits "1", that is, the number of wavelengths which are now in use. Then, the optical amplification control part 4b determines an amplified output level based on the number of wavelengths that are in use. Thus, the automatic level control is carried out so that the power of the exciting light is controlled by the amplified output level. The number of the terminal devices 1, 2 and 5, the number of optical cross-connect devices 3 and the number of optical amplifiers 4 depend on the size of the system. The optical cross-connect devices 3 may be ADM devices as in the case of the conventional art.

Each of the wavelength information vectors 7a–7d includes of first to nth bits corresponding to the respective wavelengths $\lambda 1-\lambda n$ which can be used in the system. For example, when the terminal device 1 transmits a multiplexed optical signal in which wavelengths $\lambda 1$ and $\lambda 3$ are multiplexed, the wavelength information vector 7a is "1010 . . . 0". The above wavelength information vector 7a is transferred by the supervisory control signal.

The supervisory control signal can be transmitted by $\lambda s$ which is different from the wavelengths $\lambda 1$ and $\lambda n$ which are used to transmit the main signal. The optical cross-connect device 3 drops the optical signal of the wavelength $\lambda 1$ from the received signal, and adds the same thereto. Hence, there is no change in the wavelength information to be supplied to the optical amplifier 4 from the optical cross-connect device 3. In the optical amplifier 4, the number of wavelengths that are in use can be obtained from the bit train of the wavelength information vector. Hence, the optical amplifier 4 can immediately with respond to a change of the number of wavelengths that are in use. Hence, it is possible to avoid an abrupt change in the amplified output level.

The above arrangement can be modified as follows. Before the number of wavelengths is increased or decreased, the increased or decreased number of wavelengths is sent to the optical amplifier 4 by the supervisory control signal. The optical amplification control part 4b of the optical amplifier 4 controls the amplified output level so that it is gradually changed. Hence, the increased or decreased number of wavelengths in the terminal devices 1, 2 and 5 can be achieved. The state of the optical amplifier 4 is supervised. If an abnormality such as a saturated output state is detected, the optical amplifier 4 notifies the terminal device at the transmission side of the occurrence of an abnormality using the supervisory control signal. Then, the optical amplifier 4 returns the amplified output level to the level before the number of wavelength is changed. Further, the terminal device located at the transmission side stops changing the number of wavelengths that are in use.

FIGS. 3A, 3B and 3C show the path vector. FIG. 3A shows that optical signals applied to input terminals A1–AN of the optical cross-connect device 3 are switched or cross-connected to output terminals B1–BN thereof and are then transmitted. The wavelength information vector shown in FIG. 3C is formed in connection with the above cross-connecting operation. The wavelength information vector includes an n-bit train consisting of n bits respectively corresponding to the usable wavelengths $\lambda 1-\lambda n$. Each of the n bits is assigned "1" when the corresponding wavelength is in use and is assigned "0" when the corresponding wavelength is not in use. Further, a path matrix shown in FIG. 3B is created in which the wavelength information vector forms the diagonal elements. In FIG. 3B, the diagonal elements of the path matrix are denoted as $\lambda 1-\lambda n$ that the wavelengths of the multiplexed optical signal. All of the non-diagonal elements are "0". The wavelength information vector describing the wavelengths of the multiplexed signal obtained at the output terminal of each terminal device can be described in which the diagonal elements correspond to the input terminals $\lambda 1-\lambda N$ for the respective wavelengths. The wavelength information vector in the transmitting direction can be derived from the wavelengths which are added or dropped by the process of the path matrix.

The aforementioned path matrix can be defined as follows. A matrix Pij is defined as follows:

$$*\lambda Bj = Pij * \lambda i \qquad (1)$$

where $*\lambda Bj$ (* is a symbol indicating vector) denotes a wavelength information vector obtained at output terminal Bj (J=1–M) when an optical signal of a wavelength $\lambda i$ is applied to an input terminal Ai (I=1–N), and $*\lambda i$ denotes a wavelength information vector. Equation (1) stands under the condition that there are no input signals from the input terminals other than the input terminal Ai.

The wavelength information vector $*\lambda BJ$ which is output to the output terminal Bj when there are a plurality of input signals can be written as follows:

$$*\lambda Bj = \Sigma^{N}_{i-1} Pij *\lambda i \qquad (2)$$

where $\Sigma^{N}_{i-1}$ denotes the accumulation from i=1 to i=N.

FIGS. 4A, 4B and 4C show a process using the path matrix. It will be assumed that the wavelength information vectors $*\lambda 1- N$ included in the supervisory control signals are received via input terminals A1–AN in the structure shown in FIG. 4A. The structure shown in FIG. 4A can be represented by path matrix P1j, P2j, ..., PNj respectively related to the input terminals A1, A2, ..., AN. The path matrix P1j includes the wavelength information vector $\lambda 1$ as the diagonal elements. The path matrix P2j includes the wavelength information vector $\lambda 2$ as the diagonal elements. The wavelength information vectors $*\lambda B1-*\lambda BM$ of the output terminals B1–BM can be expressed as shown in FIG. 4C.

If there are a plurality of identical elements in the path matrixes Pij, the identical wavelengths are input via different input terminals and collide with each other. That is, when "1" is added to each bit of each of the wavelength information vectors, "1" is obtained if no collision occurs, and a number equal to or greater than "2" is obtained if a collision occur in the corresponding wavelength. For example, even when a wavelength is not used in a terminal device, a collision will occur if identical wavelengths are added in a plurality of devices in the wavelength-multiplexed optical transmission system, such as ADM devices or optical cross-connect devices. In such a case, by processing the above-mentioned path matrixes Pij, it is possible to easily determine whether there are identical elements and thus determine whether a collision occurs.

The number of wavelengths included in the wavelength-multiplexed optical signal from the output terminal Bi is obtained by using the wavelength information vector $*\lambda Bi$ of the output terminal and is expressed as $|*\lambda Bi|^2$. Hence, based on the above number of wavelengths, it is possible to control the power of the exciting light in the optical amplifier 4 (FIG. 2) and perform the optimal automatic level control.

Signals are transferred between the terminal devices over a pair of lines, namely, an up line and a down line. In this case, in the optical cross-connect devices, repeaters, ADM devices and terminal device which are located at the reception side, received-state vectors indicating the wavelengths that are received are created as in the case of the wavelength information vectors. The received-state vectors can be transmitted to the transmission side using the supervisory control signals. Hence, at the transmission side, it is possible to easily determine whether the optical signals of the target wavelengths have been transmitted to the target reception devices.

When the received-state vector of the input terminal Ai at the reception side is denoted as $*\lambda Ri$, it shows the received state of the wavelength transmitted via the output terminal Bi corresponding to the input terminal Ai. Hence, by processing the received-state vector $*\lambda Ri$ in the repeaters and optical cross-connect devices in the same way as the process of the path matrix, it is possible to determine, at the transmission-side terminal device, whether the wavelengths transmitted by the above transmission-side terminal device have duly been received by referring to the received-state vector $*\lambda Ri$.

In the ADM devices and the optical cross-connect devices, the optical signal of a wavelength $\lambda k$ is subjected to a branch process in which it is demultiplexed to a plurality of outputs. In this case, each of the ADM devices and the optical cross-connect devices receive the received-state vectors from the reception sides equal in number to the branching outputs. In a case where the branching process is directed to two outputs forming the work and protection systems, even if only one of the received-state vectors indicates that the wavelength $\lambda k$ is normal, the received-state vector indicating that the wavelength $\lambda k$ is normal is sent back to the transmission side. In contrast, in a case where none of the branching outputs serve as a protection system, if one of the received-state vectors indicates abnormality related to the wavelength $\lambda k$, the transmission side can be notified of the occurrence of such an abnormality by using the supervisory control signal. Hence, the devices located at the branching points are notified beforehand of information indicating whether the branching of the optical signal is directed to the redundancy system or broadcasting. Hence, the appropriate process of the received-state vectors can be selected.

Figure 5:
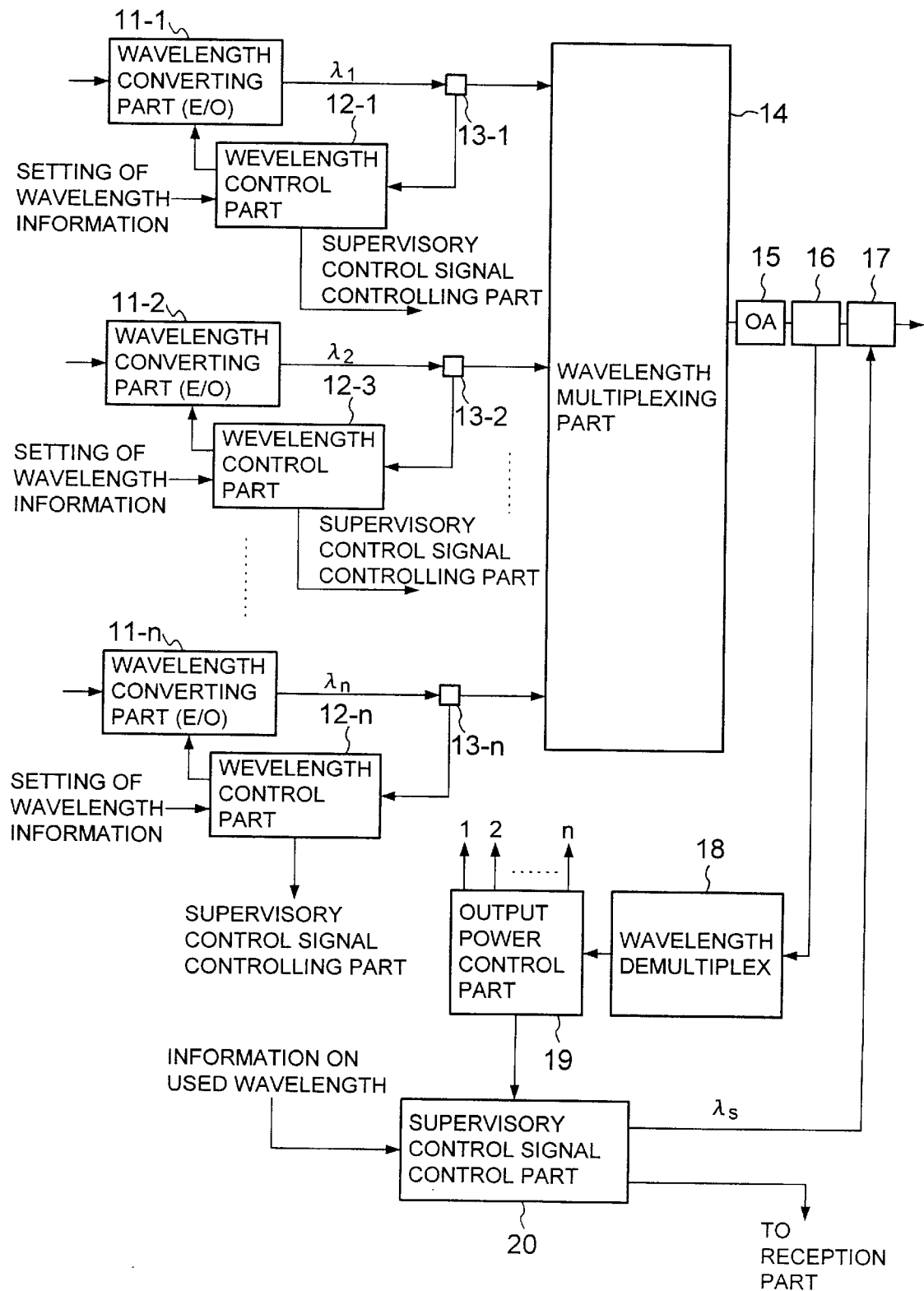
FIG. 5 is a block diagram of a transmission part according to an embodiment of the present invention.

FIG. 5 is a block diagram of a transmission part according to an embodiment of the present invention. The structure shown in FIG. 5 is a transmission part included in devices such as the terminal devices and the repeaters. The transmission part includes wavelength converting parts 11-1–11-n (or electrical-to-optical converters E/O), wavelength control parts 12-1–12-n, optical branching parts 13-1–13-n, a wavelength multiplexing part 14, an optical amplifier (OA) 15, an optical branching part 16, an optical combining part 17, a wavelength demultiplexing part 18, an output power control part 19, and a supervisory control signal control part 20.

Wavelength setting information is input to the wavelength control parts 12-1–12-n from an upper device (not shown for the sake of simplicity). The electric or optical signals applied to the wavelength converting parts 11-1–11-n are converted into optical signals of wavelengths $\lambda 1-\lambda n$ in accordance with the wavelength setting information. The optical signals are input to the wavelength multiplexing part 14 via the optical branching parts 13-1–13-n. The resultant wavelength-multiplexed optical signal is amplified by the optical amplifier 15, and is output to an optical transmission path via the optical branching part 16 and the optical combining part 17.

The optical signal which carries the supervisory control signal is dropped by the wavelength demultiplexing part 18. The output power control part 19 controls the optical amplifier (not shown for the sake of simplicity) on the basis of the wavelength information vector transferred using the supervisory control signal, which is also transferred to the supervisory control signal control part 20. The control part 20 creates the aforementioned wavelength information vector in accordance with the information indicating the wavelengths that are used from the wavelength control parts 12-1–12-n, and performs the process using the path matrix. Thus, the control part 20 produces the supervisory control signal of the wavelength $\lambda s$, which is combined with the main signals of the wavelengths $\lambda 1-\lambda n$ by the optical combining part 17. Then, the resultant optical signal is output to the optical transmission path.

Figure 6:
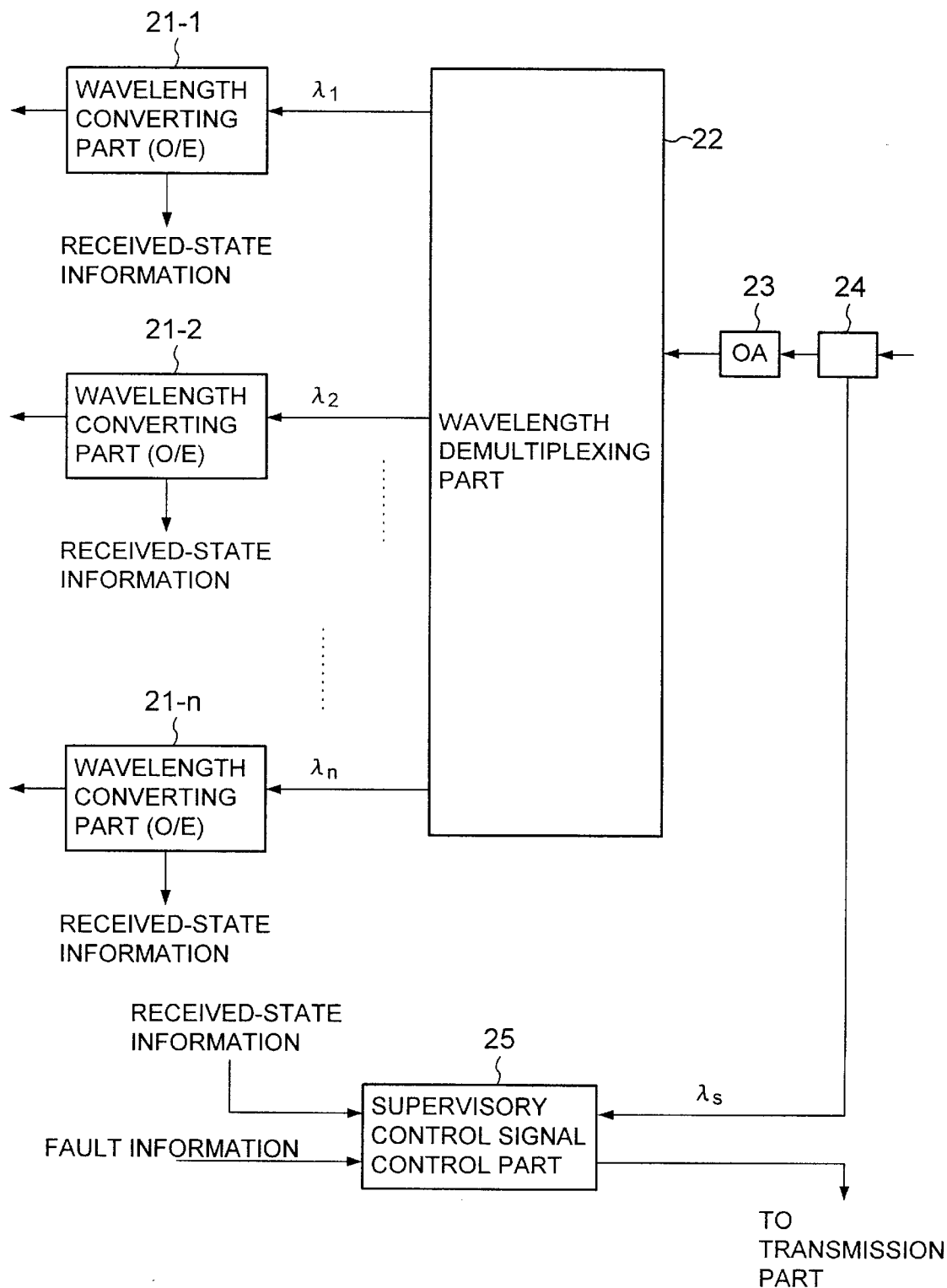
FIG. 6 is a block diagram of a reception part according to an embodiment of the present invention.

FIG. 6 is a block diagram of a reception part according to an embodiment of the present invention. The structure shown in FIG. 6 is a reception part of the devices such as the terminal devices and the repeaters. The reception part includes wavelength converting parts 21-1–21-n (or opticalto-electrical converters O/E), a wavelength demultiplexing part 22, an optical amplifier 23 (OA), an optical branching part 24 and a supervisory control signal control part 25.

The wavelength-multiplexed optical signal received over the optical transmission path is input to the wavelength demultiplexing part 22 via the optical branching part 24 and the optical amplifier 23, and is thus demultiplexed into optical signals of wavelengths $\lambda 1$–$\lambda n$. The demultiplexed optical signals are then input to the wavelength converting parts 21-1–21-n, and are thus converted into desired wavelengths suitable for a process of receiving or electric signals. The received state information concerning the above receiving process is input to the supervisory control signal controlling part 25.

The wavelength $\lambda s$ is separated by the optical branching part 24 and is applied to the supervisory control signal control part 25. Also fault information including information on the states of the stages following the structure shown in FIG. 6 is input to the control part 25. Hence, the supervisory control signal is produced and is transferred to the transmission part (FIG. 5). In this case, the supervisory control signal control part 20 of the transmission part 20 and the supervisory control signal control part 25 of the reception part 25 can be unified or integrated.

Figure 7:
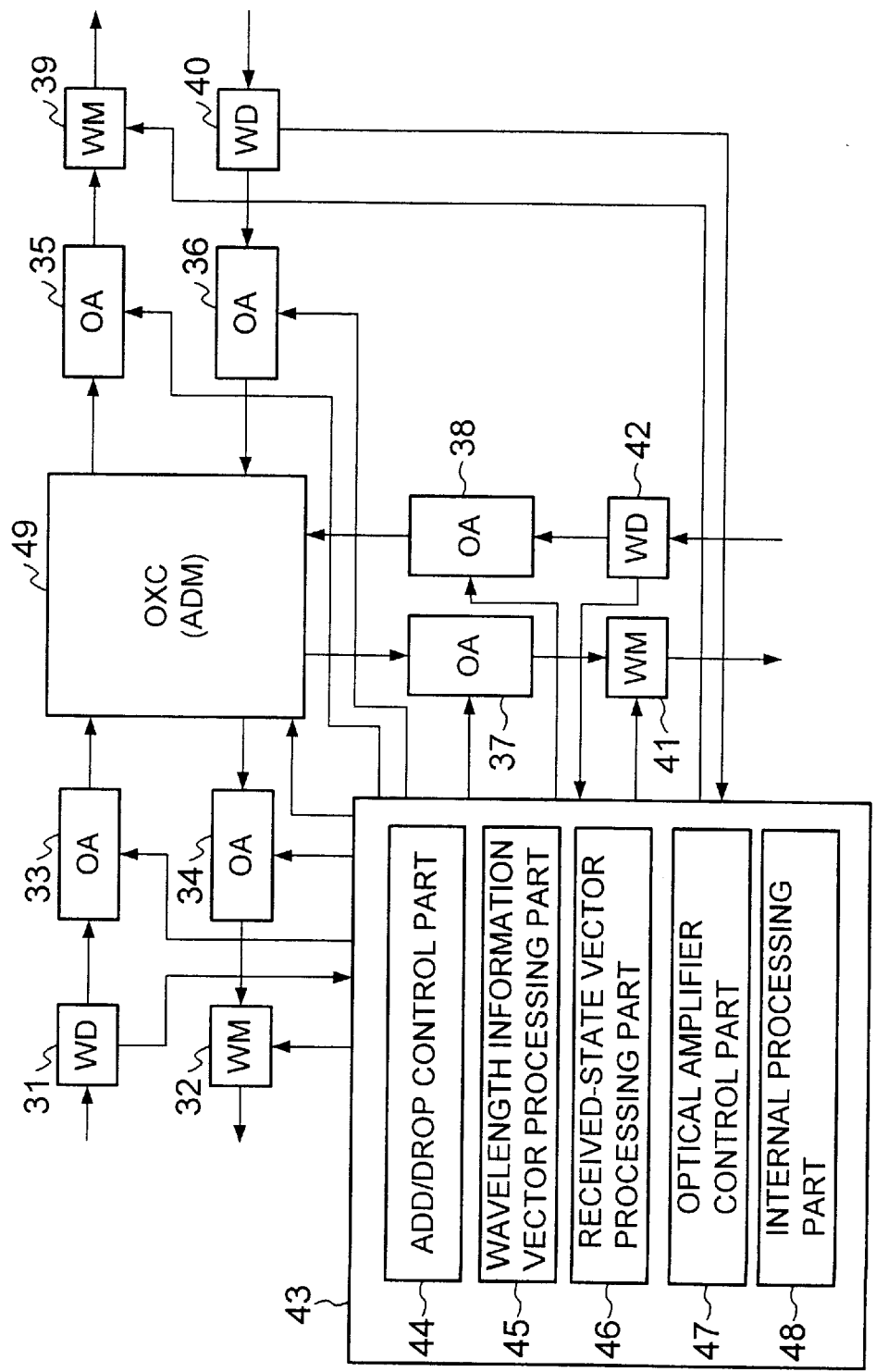
FIG. 7 is a block diagram of an optical cross-connect device according to an embodiment of the present invention.

FIG. 7 is a block diagram of the optical cross-connect device according to an embodiment of the present invention. The ADM (Add/Drop Module) has the same structure as shown in FIG. 7. The optical cross-connect device shown in FIG. 7 includes wavelength demultiplexing parts (WD) 31, 40 and 42, wavelength multiplexing parts (WM) 32, 39 and 41, optical amplifiers (OA) 33–38, a supervisory control signal control part 43, an add/drop control part 44, a wavelength information vector processing part 45, a received-state vector processing part 46, an optical amplifier control part 47, an internal processing part 48 performing a flag process, and an optical cross-connect part (OXC) or an add/drop part (ADM) 49.

The supervisory control signals of the wavelength $\lambda s$ are distributed to the supervisory control signal control part 42 by the wavelength demultiplexing parts 31, 40 and 42. The supervisory control signal control part 43 is formed of, for example, a processor. The add/drop control part 44 controls the optical cross-connect part 49 in accordance with the cross-connect information concerning the wavelength-multiplexed optical signal including the wavelengths $\lambda 1$–$\lambda n$.

The wavelength information vector processing part 45 extracts the wavelength information vectors from the supervisory control signals, and creates, by the path matrix process, the wavelength information vectors related to the respective output terminals on the basis of the cross-connect information indicating wavelengths to be dropped or added supplied from the add/drop control part 44. Then, the wavelength information vectors are added, as the supervisory control signals of the wavelength $\lambda s$, to the main signals by the wavelength multiplexing parts 32, 39 and 41, and are output to the optical transmission paths.

The received-state vector processing part 46 extracts the received-stage vectors from the reception supervisory control signals respectively corresponding to the input terminals. Then, as has been described previously, the part 46 reformulates the received-state vectors on the basis of the branching condition information indicating whether the branching is directed to forming the redundancy or broadcasting. The reformulated received-state vectors are added, as the supervisory control signals, to the main signals by the wavelength multiplexing parts 32, 39 and 41, and are output to the optical transmission paths.

Figure 8:
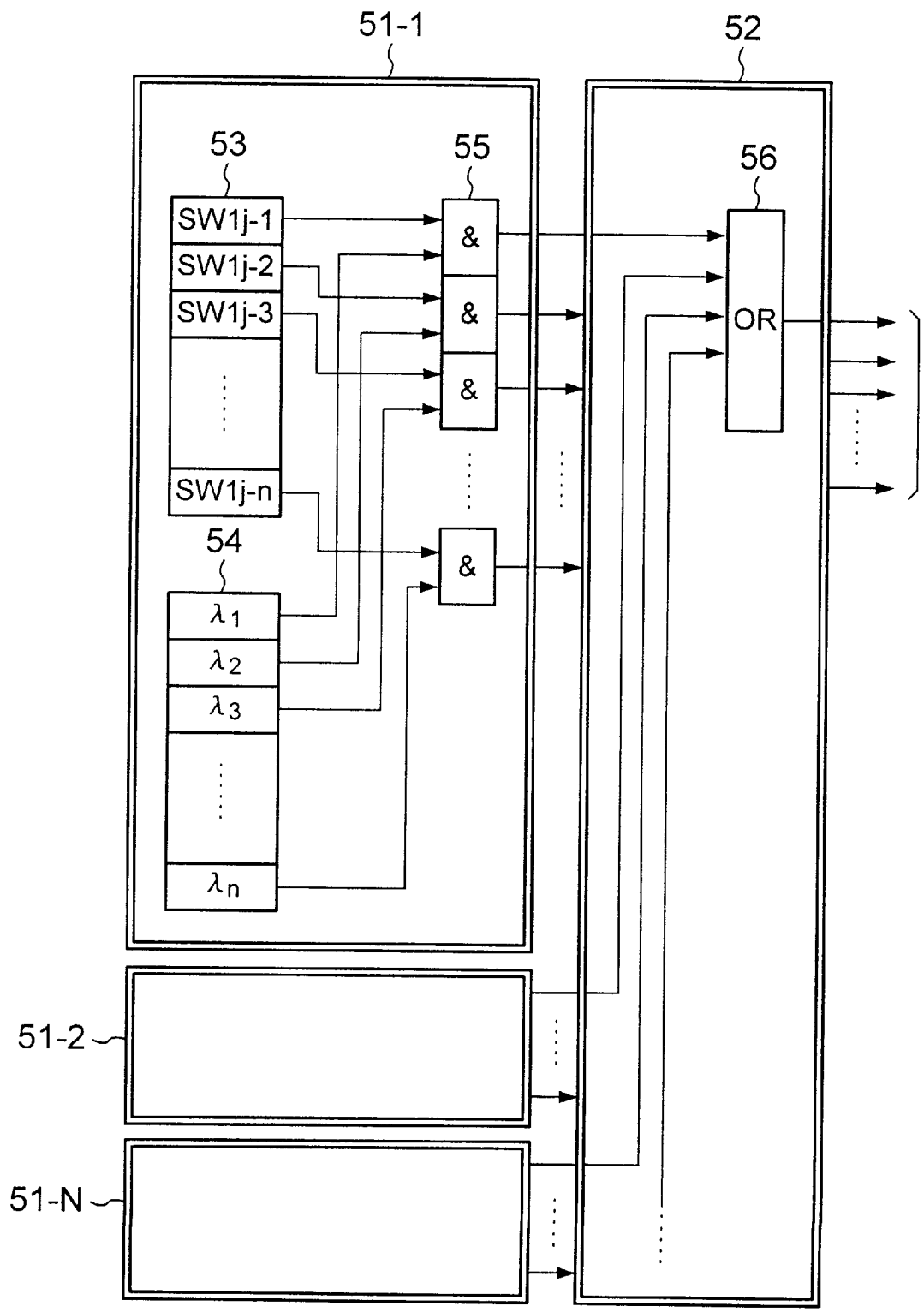
FIG. 8 is a block diagram of a wavelength information vector creating part according to an embodiment of the present invention.

FIG. 8 is a block diagram of the wavelength information vector generating part according to an embodiment of the present invention, which includes wavelength specifying parts 51-1–51-N, a combining part 52, a wavelength specifying register 53, a wavelength correspondence part 54, an AND circuit (&) 55, and an OR circuit (OR) 56.

The wavelength specifying parts 51-1–51-N respectively correspond to the input terminals A1–AN shown in FIG. 4, and have an identical structure. Pieces of used wavelength information SW1j-1–SW1j-n used in the transmitted optical signal are set in the register 53. For example, in the optical cross-connect device, the used wavelength information pieces SW1j-1–SW1j-n are set in the register 53 in correspondence with cross-connect information from the upper device.

If the used wavelength information piece SW1j-1 using the wavelength $\lambda 1$ is set in the register 53 of the wavelength specifying part 51-1 and used wavelength information pieces using other wavelengths are set in the registers 53 in the other wavelength specifying parts 51-2–51-N, "1" obtained by the AND operation on SW1j-1 and $\lambda 1$ is input to the OR circuit 56. If the wavelength $\lambda 3$ is specified as the used wavelength in the other wavelength specifying parts, the wavelength information vector output by the combining part 52 is "101 . . . 0", which indicate that the wavelengths $\alpha 1$ and $\lambda 3$ are used.

Figure 9:
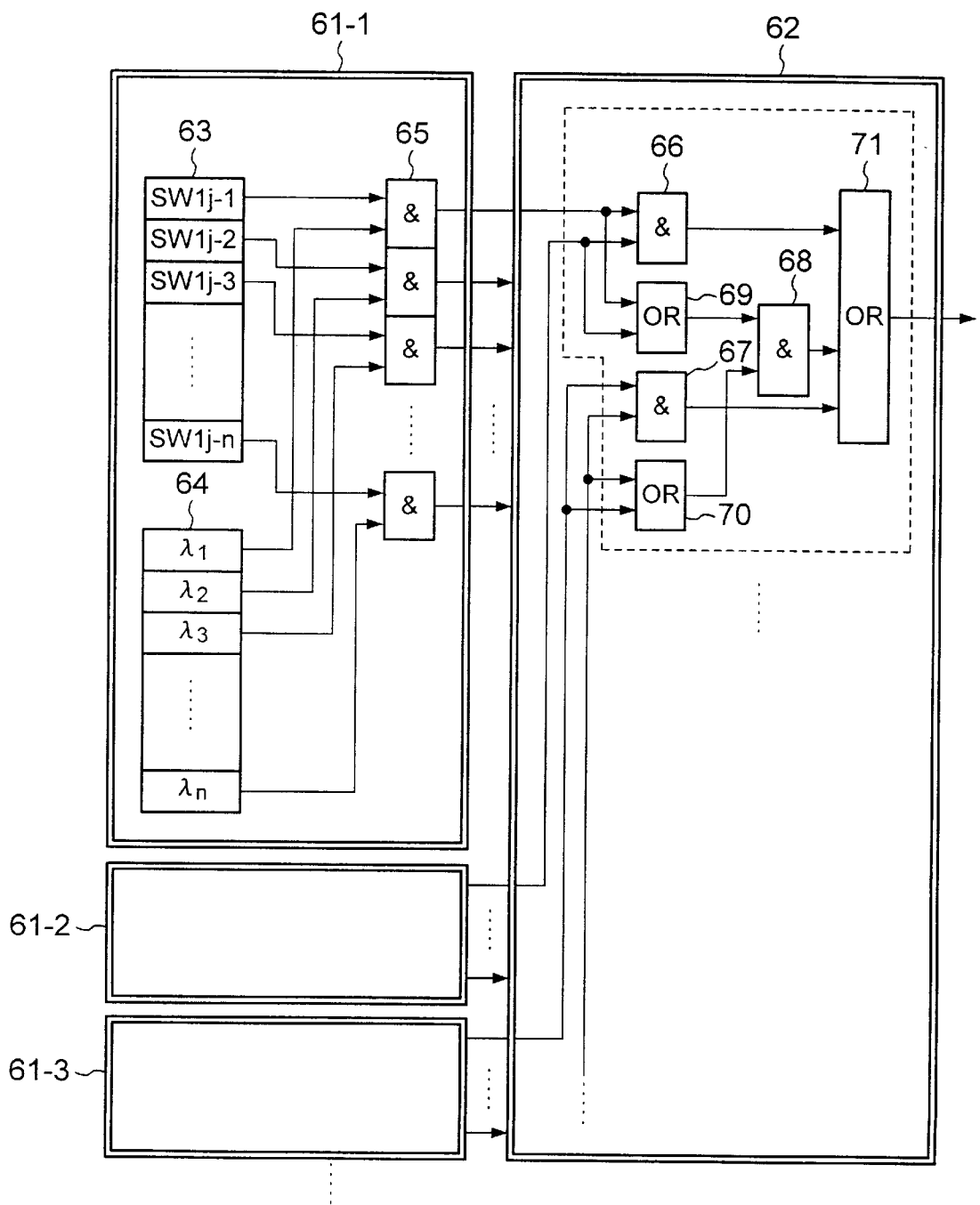
FIG. 9 is a block diagram of a collision detection part according to an embodiment of the present invention.

FIG. 9 is a block diagram of a collision detecting part according to an embodiment of the present invention. The collision detecting part includes wavelength specifying parts 61-1–61-3, a detecting part 62, a register 63, a wavelength correspondence part 64, AND circuits (&) 65–68, and OR circuits (OR) 69–71. In practice, a large number of wavelength specifying parts are provided although only three parts 61-1–61-3 are illustrated for the sake of simplicity. The wavelength specifying parts correspond to wavelength correspondence parts 51-1–51-N shown in FIG. 8, and have the same structure as each other. Hence, the output signals of the wavelength correspondence parts 51-1–512-N shown in FIG. 7 can be input to the detecting part 62. In the detecting part 62, the AND circuit 66 and the OR circuit 68 receive, from, for example, the wavelength specifying parts 61-1 and 61-2, specifying output signals. If both the specifying output signals from the wavelength specifying parts 61-1 and 61-2 specify the wavelength $\lambda 1$, the output signal of the AND circuit 66 indicates "1", which is output as a collision detection signal of "1" via the OR circuit 71.

If either the wavelength specifying part 61-1 or 61-2 uses the wavelength $\lambda 1$ and either the wavelength specifying part 61-3 or 61-4 uses the wavelength $\lambda 1$, the output signals of the OR circuits 69 and 70 are both "1". Hence, the OR circuit 71 outputs the collision detection signal of "1".

Hence, it is possible to easily detect a collision by providing logic circuits equal in number to the wavelength specifying parts. Also, by applying the aforementioned wavelength information vectors corresponding to the routes to the detecting part 62, it is possible to easily detect the presence and absence of a collision of the optical signals having the identical frequency. The collision detecting part may be provided in not only the terminal devices but also the devices having the add/drop function such as the optical cross-connect devices and the ADM devices. Hence, when a collision is detected, the terminal devices can be notified of the detection of collision by the supervisory control signals.

Figure 10:
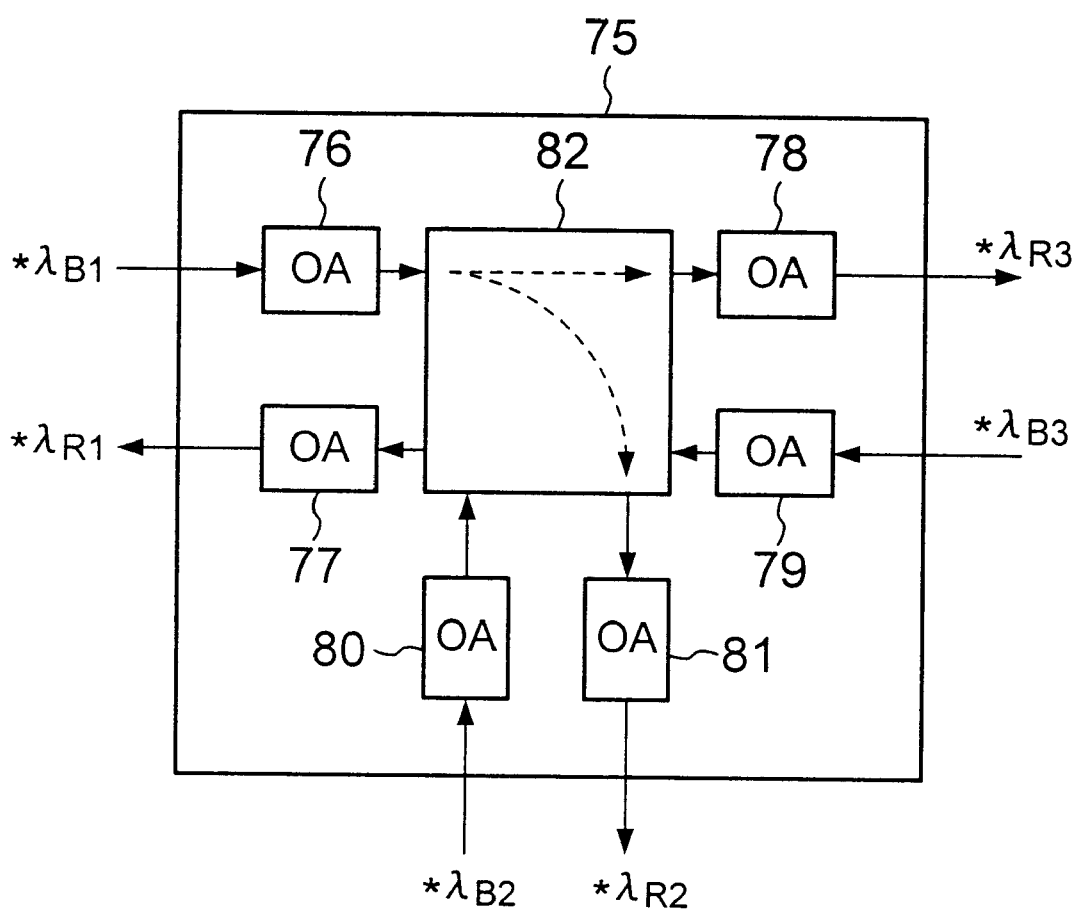
FIG. 10 is a block diagram of a state management by using the wavelength information vector according to an embodiment of the present invention.

FIG. 10 shows state management using the wavelength information vectors according to an embodiment of the present invention. The structure shown in FIG. 10 includes an optical cross-connect device or an ADM device 75, optical amplifiers (OA) 76–81, an optical cross-connect device or an ADM device 82. Symbols *λB1–*λB3 denote wavelength information vectors, and symbols *λR1–*λR3 denote received-state vectors. A structure for controlling the wavelength information vectors and the received-state vectors is omitted from FIG. 10 for the sake of simplicity.

When the wavelength information vectors *λB1–*λB3 transmitted by the opposing device are received and the received-state vectors *λR1–*λR3 indicating the received wavelengths are created and sent to the opposing device, if *λB1=*λR1, the opposing device can recognize that the normal reception has taken place in the optical cross-connect device 75. If *λB1≠λR1, the opposing device can recognize that an abnormality has taken place and which wavelength has not been received normally.

In the case where *λB1=*λR1, *λB2=*λR21 and *λB3=*λR3, if *λB1–*λR1=*λB1 (that is, *λR1=0), it is possible to determine that a fault has occurred in the optical amplifier 76. In this case, all the wavelengths cannot be received normally due to the occurrence of a fault in the optical amplifier 76. Hence, all the elements of the received-state vector *λR1 are "0".

Similarly, it is possible to determine whether a fault has occurred and identify the location of the fault by referring to the wavelength information vectors *λB2 and *λB3 and the received-state vectors *λR2 and *λR3. If an optical signal that branches as indicated by a broken-line arrow exists in the optical cross-connect part 82, the wavelength information vector sent via the optical amplifier 78 and the wavelength information vector sent via the optical amplifier 81 correspond to parts obtained by dividing the wavelength information vector received via the optical amplifier 76. Hence, by combining the received-stage vector from the opposing device in that case, if a coincidence with the received-state vector *λR1 sent to the opposing device via the optical amplifier 77 stands, it is determined that the wavelengths can duly been received. If such a coincidence is not available, information indicating which wavelength branches in which direction is saved for the control of the optical cross-connect part 82. Hence, it is possible to determine that a fault occurs in the optical amplifier or the opposing device corresponding to the wavelength in which the fault occurs.

If a fault occurs in some wavelengths, it is possible to determine the number of faulty wavelengths by a process of |*λB1–*λR1|². That is, "0" is obtained when normal as has been described previously. In other cases, it is judged that a fault occurs.

When a route of the optical signal of a wavelength is retrieved, the wavelength retrieving vector *λs-is created and sent in which the bit corresponding to the wavelength to be searched for is set to "1". For example, when a route of the optical signal of the wavelength λ3 among the wavelengths λ–λn is retrieved, the wavelength retrieving vector *λs-is "00100 . . . 0". The device through which the wavelength retrieving vector *λs passes, such as the optical cross-connect device sends it to the device of the next stage, and sets a flag indicating the reception direction in the internal processing part 48 (see FIG. 7). Then, the device sends the ID of its own device and the wavelength retrieving vector *λs in the direction indicated by the flag. Hence, in the terminal device which transmits the wavelength retrieving vector *λs, it is possible to identify the route of the retrieved wavelength by referring to the received ID.

FIGS. 11A–11D show formats of the supervisory control signals used in the embodiment of the present invention. More particularly, FIGS. 11A, 11B and 11C show essential parts of the supervisory control signals for retrieving the route of the optical signal of a desired wavelength, and FIG. 11D shows the format of the entire supervisory control signal. In the fields shown in FIGS. 11A–11D, a symbol C/R is an indication bit which is "1" when a command is indicated and is "0" when a response is indicated. A symbol F denotes a framing bit, and AIS denotes an alarm indication signal. A symbol DCC denotes a data communication channel, and E1L denotes an order wire of channel. A symbol OWC denotes an order wire cut in which the order wire is cut in a master station. MODE denotes a mode specifying field in which various modes can selectively be specified. CODE 1 and CODE 2 denote type indication fields used to indicate types of vector and to more particularly indicate whether vectors 1 and 2 are wavelength information vectors or received-state vectors. COUNTER denotes a counter field used to count the number of devices located along a route in path retrieval or the like. ID denotes an ID field used to identify the repeaters and optical cross-connect devices.

Examples of the modes are (1) normal mode, (2) path retrieval mode, (3) route retrieval 1 mode, (4) route retrieval 2 mode, (5) flat reset mode, (6) data link network/end setting mode, (7) retrieval request mode, (8) reception notification mode, (9) completion notifying mode, (10) advanced notice mode, (11) reception acknowledgement request mode, (12) master station notification bit, (13) an error notification bit, and (14) ADM release/lock bit. The above information can be set in the mode specifying field MODE.

Figure 1:
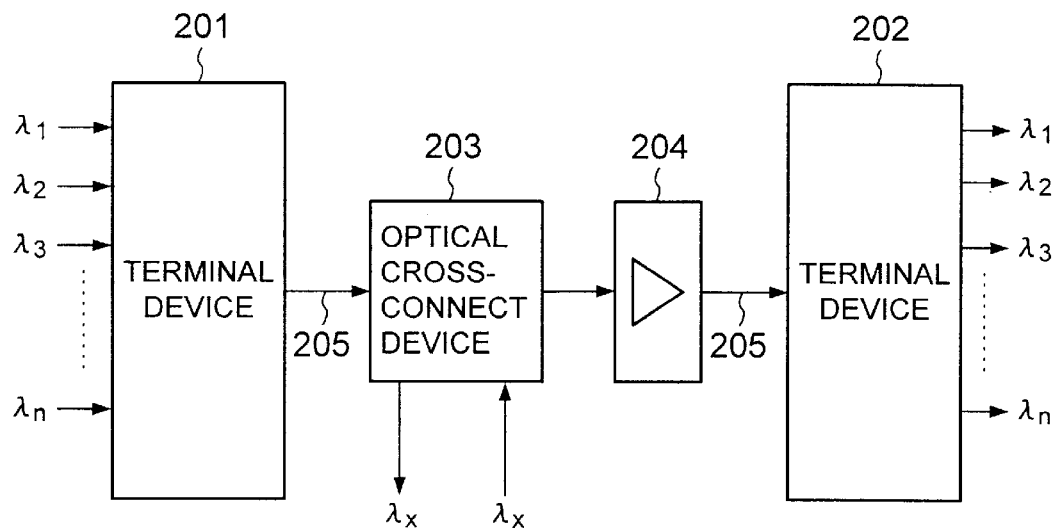
FIG. 1 is a block diagram of a conventional wavelength-multiplexed optical transmission system.

In the case where the route of the optical signal of a wavelength is searched for, the indication bit C/R shown in FIG. 11A is set to "1" in order to indicate that the supervisory control signal is a command. The retrieved-wavelength *λs of the command is written into the wavelength retrieving vector storing field next the C/R field. The repeater/terminal device ID storing field of the command is kept empty. The supervisory control signal thus formed is sent. In the format of the supervisory control signal shown in FIG. 1D, the C/R field has "1", and the wavelength retrieving vector storing field corresponds to code 1 and vector 1. Further, the repeater/terminal device ID storing field corresponds to code 2 and vector 2.

The device such as the optical cross-connect device which receives the supervisory control signal including the wavelength retrieving vector *λs sets its own ID in the repeater/terminal device ID storing field, and sets the indication bit C/R to "0". Hence, the supervisory control signal which is indicated as a response is returned to the transmission side. Hence, as has been described previously, it is possible to identify the route of the optical signal having the retrieved wavelength by referring to the ID written into the repeater/terminal device ID storing field of the response.

FIG. 11B shows a case in which a counter field is provided. The transmission part for retrieving the route of the optical signal of a wavelength sets the initial value "0", to the counter field, and sets the indication bit C/R to "1". Hence, the supervisory control signal, which wavelength retrieving vector storing field storing the wavelength retrieving vector *λs, is indicated as a command, and is sent.

The device such as the optical cross-connect device which receives the above supervisory control signal increments the value in the counter field by +1, and transfers it to the device of the next stage. Further, the device sets the indication bit C/R of the received supervisory control signal to "0", which is thus indicated as a response. The device writes its own ID into the repeater/terminal device ID storing field, and returns the supervisory control signal or response to the transmission side. Hence, in the transmission side, it is possible to identify the order of the sections forming the route and to identify the devices provided in the route.

FIG. 11C shows a case where the field for the mode setting is provided. For example, the normal mode is set in the mode setting field, and the wavelength information vector is written into the wavelength retrieving vector or wavelength information storing field. The indication bit C/R is set to "1", and the value of the counter field is set to "0". The supervisory control signal thus formed is sent. Then, the following information is received. The aforementioned received-state vector indicating the received wavelengths is set to the repeater/terminal device ID or received-state vector storing field, and the indication bit C/R is set to "0". A value corresponding to the number of devices involved with transfer is written into the counter field. Hence, the received states of the optical signals of the transmission wavelengths can be detected.

When the path retrieval mode is set in the mode setting field and the wavelength retrieving vector is set as described with reference to FIG. 11B, it is returned so that the ID is set in the repeater/terminal device ID or the received-state vector storing field. Thus, as described before, it is possible to retrieve the route of the optical signal of the wavelength to be retrieved including the value of the counter field.

Hence, generally, it is possible to retrieve the transmission/reception state of the optical signal between the devices such as the terminal devices, the usable wavelengths, and the transmission route of the optical route by setting code 1 and vector 1 to the retrieved-wavelength storing field or the wavelength information vector storing field and setting code 2 and vector 2 to the repeater/transmission terminal ID or received-state vector storing field.

As described before, it is possible to notify the device of the number of wavelengths in use by using the wavelength information vector and to thus utilize the notified number of wavelengths to control the gain of the optical amplifier. When the elements of the wavelength information vector are changed due to an increase or decrease of the number of wavelengths, the automatic level control of the optical amplifier is changed. For example, when the identical wavelength information vector is received a predetermined number of times which corresponds to the number of protection stages, it is recognized that the information indicating the number of wavelengths has duly been received. Then, the control of the optical amplifier is allowed to be changed.

There is a possibility that the supervisory control signal for transmitting the wavelength information vector may be broken down due to a certain cause. When such a fault occurs, the supervisory control signal for notifying the devices located at the downstream side of occurrence of the fault. In this case, the optical amplifier at the downstream side maintains its previous state. That is, the wavelength information vector included in the supervisory control signal indicating the occurrence of a fault is masked, and the wavelength information vector included in the supervisory control signal used at the normal time is maintained. Hence, the optical amplifier can be controlled in the previous state. This is intended to prevent the optical amplifier from shifting to an abnormal operating state and maintain the previous control state if the number of wavelengths that are in use become indefinite due to occurrence of an abnormality in the supervisory control signal although there is actually no change of the number of wavelengths in use.

When both the main signal and the supervisory control signal are broken down due to an accident such as a breakdown of the optical transmission path, no signal is input to the optical amplifier. Thus, the power of the exciting light is increased to the given output level. With the above in mind, when a condition for showing breakdown of the main signal stands, all the elements of the wavelength information vector are set to "0", and the operation of the optical amplifier is stopped. That is, the operation of the semiconductor laser which generates the exciting light is stopped so that the optical amplifier can be protected.

When the number of wavelengths used in the transmission-side terminal device is increased or decreased, the optical amplifier is pre-noticed of such an increase or decrease in the number of wavelengths by the supervisory control signal. Then, the optical amplifier is controlled so as to gradually reach the optical output level based on the number of wavelengths after the changing within a given time. Hence, the number of wavelengths actually used in the transmission-side terminal device.

In this case, there is a possibility that the optical amplifier may become to the saturated state when the number of wavelengths used is increased. If such an optical amplifier which is in the saturated state exists, the optical amplifier is controlled to return to the original control state during the control of gradually changing the optical output level. Further, the transmission-side terminal device is informed of an abnormality in the optical output level by the supervisory control signal. The transmission-side terminal device stops increasing the number of wavelengths, and notifies each optical amplifier that the control to gradually increase the number of wavelengths is stopped. Hence, it is possible to prevent the optical amplifiers from becoming to an abnormal state before it happens. The above-mentioned control of the optical amplifiers can be carried out by the optical amplification control part 4b (see FIG. 2).

Figure 12:
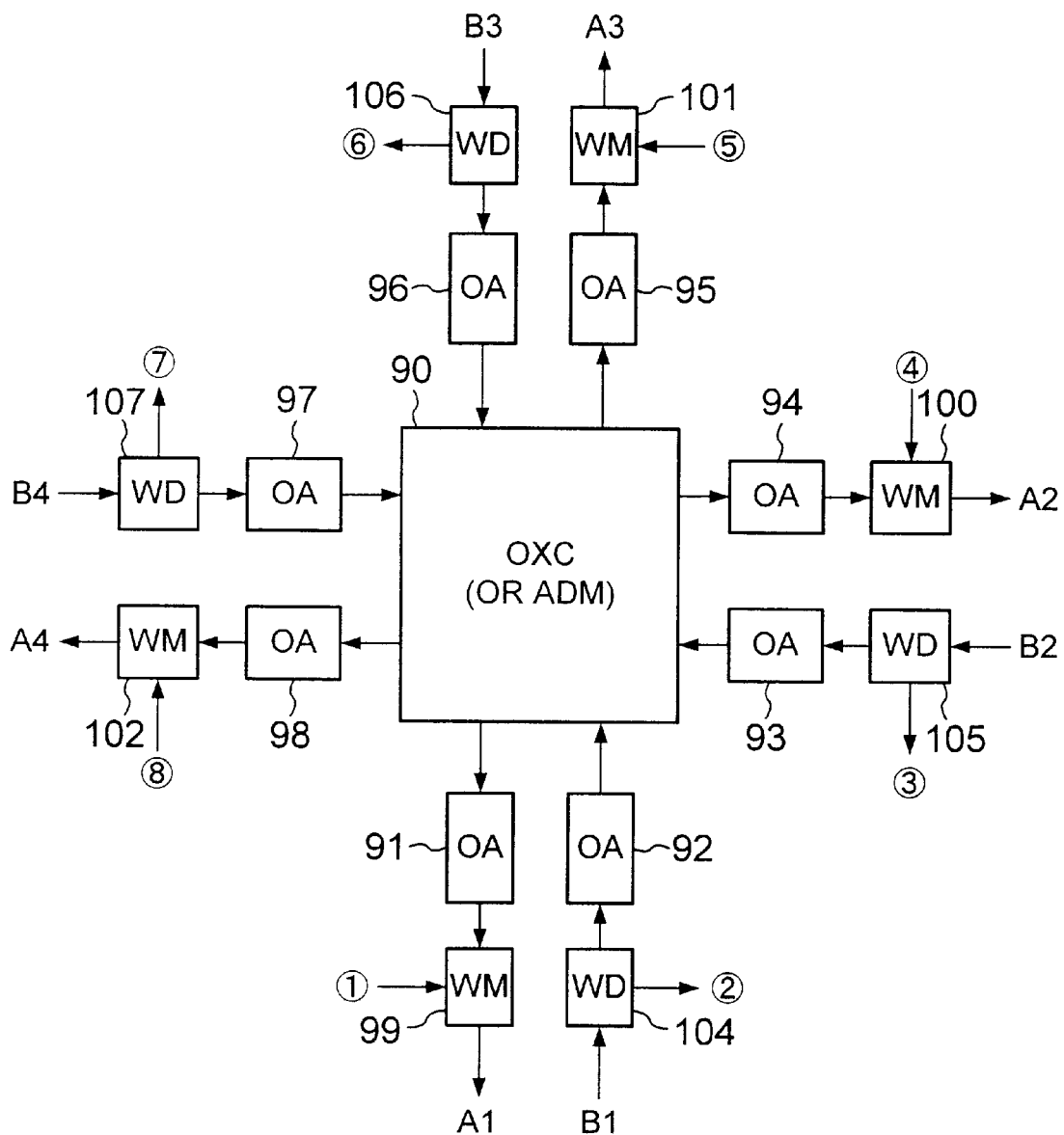
FIG. 12 is a block diagram illustrating an optical cross-connect device and an add/drop process.

FIG. 12 is a block diagram of the optical cross-connect device and an add/drop operation on the supervisory control signal. The optical cross-connect device includes an optical cross-connect part (OXC) or an add/drop module part (ADM) 90. optical amplifiers 91–98, wavelength multiplexing parts (WM) 99–102, wavelength demultiplexing part (WD) 103–107, output terminals A1–A4, and input terminals B1–B4. Reference numbers $\hat{1}$–$\hat{8}$ indicate adding and dropping of the supervisory control signals.

For example, the supervisory control signal is separated from the wavelength-multiplexed optical signal applied to the input terminal B1 by the wavelength demultiplexing part 104. The supervisory control signal is multiplexed to the main signal of the wavelength-multiplexed optical signal. Then, the wavelength-multiplexed optical signal with the supervisory control signal added thereto is output via the output terminal A1. With respect to the wavelength-multiplexed optical signal from the input terminal B1, the optical cross-connect part 90 selects any of the output terminals A2, A3 and A4 in accordance with the cross-connect information, and performs the wavelength converting process. If the ADM device is used instead of the optical cross-connect device, the wavelength-multiplexed optical signal from the input terminal B1 is demultiplexed on the wavelength basis in accordance with destination information. The demultiplexed signals are added to the main signals from the other input terminals, and are distributed to the output terminals A2–A4.

Figure 13:
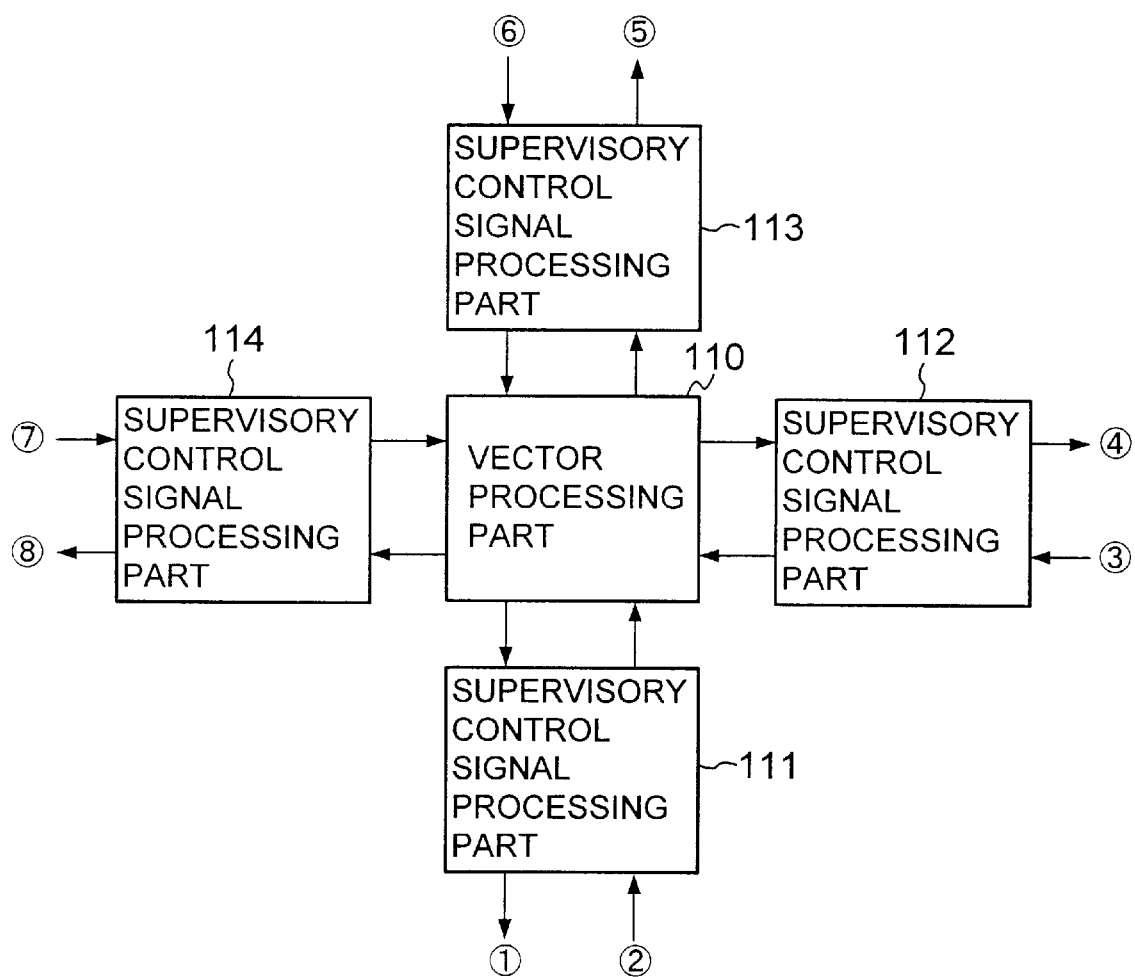
FIG. 13 is a block diagram of a supervisory control signal control part.

FIG. 13 is a block diagram of the supervisory control signal control part, which includes a vector processing part 110, and supervisory control signal controlling parts 111–114. Reference numbers $\hat{1}$–$\hat{8}$ correspond to those shown in FIG. 12, and indicate the supervisory control signals to be added or dropped. For example, the supervisory control signal dropped from the wavelength-multiplexed optical signal applied to the aforementioned input terminal B1 (see FIG. 12) is input to the supervisory control signal processing part 111, which extracts, for example, the wavelength information vector therefrom. The extracted wavelength information vector is transferred to the vector processing part 110.

The vector processing part 110 generates a new wavelength information vector using the path matrix on the basis of the wavelength information vectors from the routes and the wavelength-multiplexed optical signals output to the routes. Then, the vector processing part 110 places the newly created wavelength information vectors in the given fields of the supervisory control signals in the supervisory control signal processing parts 111–114. For example, the supervisory control signal from the supervisory control signal processing part 111 is multiplexed to the main signal by the wavelength multiplexing part 102, and is then sent to the optical transmission path via the output terminal A1.

Figure 14A:
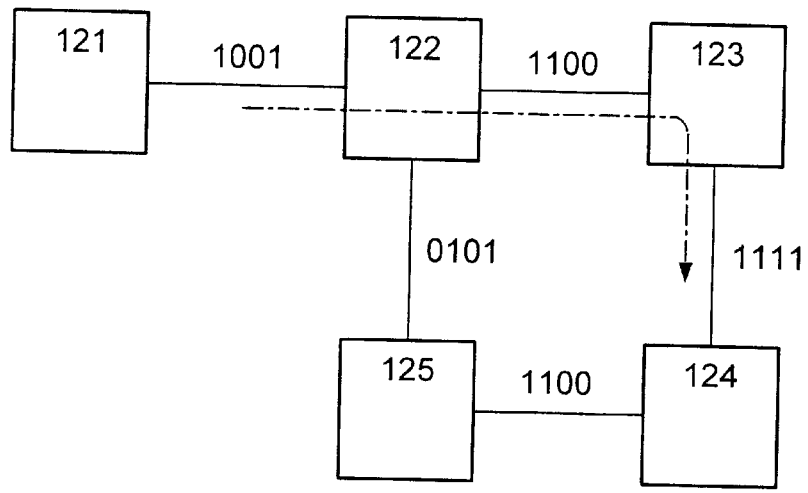
FIGS. 14A and 14B are diagrams illustrating a retrieval of a usable wavelength.
Figure 14B:
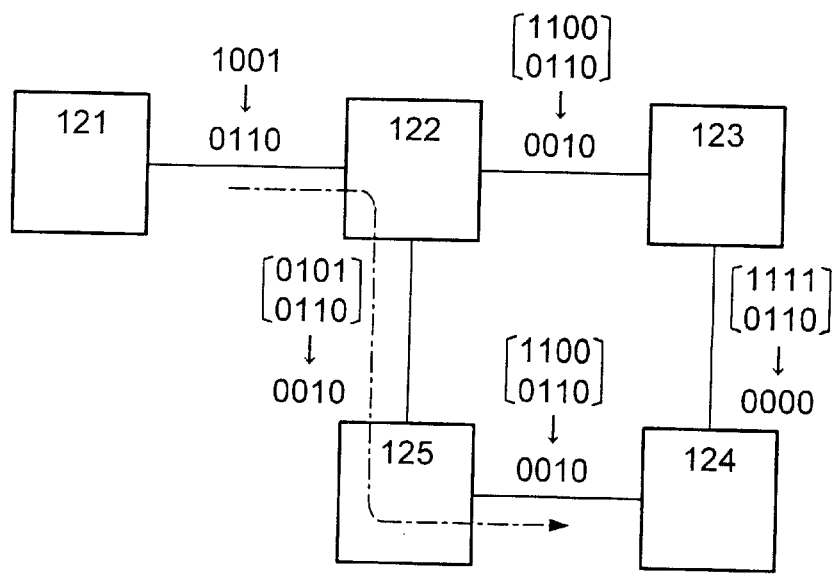

FIGS. 14A and 14B show a retrieval process for retrieving an available or usable wavelength. In FIGS. 14A and 14B, illustrated are terminal devices, optical cross-connect devices or ADM devices 121–125 each including the supervisory control signal controlling part shown in FIG. 13. FIG. 14A shows that an optical signal is transferred from the terminal device 121 to the terminal device 124 via the terminal device 123 by an optical signal corresponding to the first element of the wavelength information vector in a case shown in the following table:

| From | To | Wavelength Information Vector |
|---|---|---|
| device 121 | device 122 | "1001" |
| device 122 | device 123 | "1100" |
| device 123 | device 124 | "1111" |
| device 125 | device 124 | "1100" |

The received-state vectors obtained at the time of normal reception are as follows:

| From | To | Received-State Vector |
|---|---|---|
| device 124 | device 123 | "1111" |
| device 123 | device 122 | "1100" |
| device 122 | device 121 | "1001" |

Hence, the device 121 receives the same received-state vector as the wavelength information vector and determines that the normal reception is carried out.

In the above-mentioned communication state, even if the line between the terminals 122 and 123 is broken down, the terminal device 121 continues to communicate with the device 124 via the device 125 by using the third wavelength, which can obtained from wavelength information vector "0101" between the devices 122 and 125 and wavelength information vector "1100" from the devices 125 and 124.

As shown in FIG. 14B, the means for detecting the usable wavelength in the device 121 sends the supervisory control signal, which has, as the wavelength retrieving vector, a vector indicating wavelengths that are not in use in the device 121, that is, a vector "0110" having the inverted elements of wavelength information vector "1001". The above vector "0110" indicates wavelengths that are not in use. In this case, the retrieval mode is set in the mode field of the format shown in FIG. 1D, and "1" is written into the C/R field. Further, the wavelength retrieving vector is inserted into the fields of code 1 and vector 1.

The device 122 calculates an AND operation on the elements of the inverted version "0011" of the wavelength information vector "1100" between the devices 122 and 123 and the elements of the received wavelength retrieving vector "0110". Then, the device 122 sends the result of the above AND operation, namely, "0010", to the device 123 as a wavelength retrieving vector. Similarly, the device 122 calculates an AND operation on the elements of the inverted version "1010" of the wavelength information vector "0101" between the devices 122 and 125 and the elements of the received wavelength retrieving vector "0110". Then, the device 122 sends the result of the above AND operation, namely, "0010", to the device 125 as a wavelength retrieving vector.

The device 123 calculates an AND operation on the inverted elements "0000" of the wavelength information vector "1111" between the devices 123 and 124 and the elements of the received wavelength retrieving vector "0010". The result of the above AND operation is "0000", which indicates that there are no available wavelengths. The device 125 calculates an AND operation on the inverted elements "0011" of the wavelength information vector "1100" between the devices 125 and 124 and the elements of the received wavelength retrieving vector "0010". Then, the device 125 sends the result "0010" of the above AND operation to the device 124 as the wavelength retrieving vector.

The device 123 sends the received wavelength retrieving vector "0010" to the device 121 as a response. For example, in the format shown in FIG. 11D, "0" is written into the C/R field, and the vector obtained by the wavelength retrieval is written into code 2 and vector 2. The device 121 can recognize, from the response, that the device 121 can continue to communicate with the device 124 via the device 125 by using the third wavelength.

As described before, by using the wavelength retrieving vector, it is possible to retrieve the devices located in a bypass route by referring to the wavelength which can be used at the time of occurrence of a fault and the ID included in the response. In this case, the retrieval result should be sent back to the receiving direction in which the wavelength retrieving vector is received. Thus, it is required to store the direction in which the wavelength retrieving vector is received. When the bypass route can be formed by using the result of the wavelength retrieval.

Figure 15:
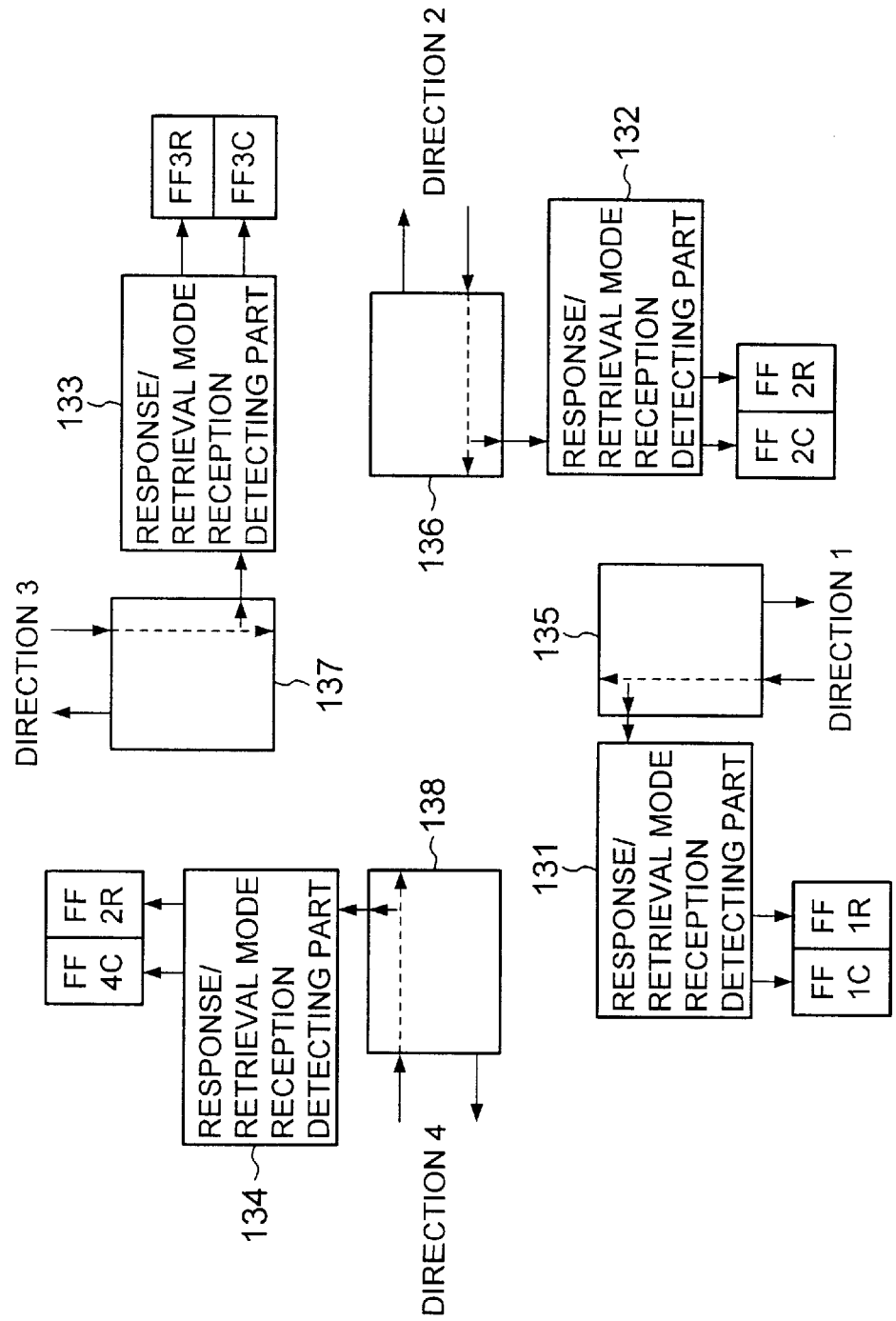
FIG. 15 is a block diagram of a receiving direction memory part.

FIG. 15 is a block diagram of a receiving direction memory part, which is provided in the devices capable of receiving and sending signals in the four directions shown in FIGS. 12 and 13, such as the optical cross-connect devices and the ADM devices. The receiving direction memory part shown in FIG. 15 includes response/retrieval mode reception detecting parts 131–134, transmitter/receiver parts 135–138 respectively corresponding to the four directions 1–4 (optical transmission paths), and flip-flops FF1C–FF4C and FF1R–FF4R. The flip-flops FF1C–FF4C correspond to inner flags for storing the receiving directions in which the retrieval commands are received. The flip-flops FF1R–FF4R correspond to inner flags for storing the directions in which the responses to the retrieval commands are received.

For example, the transmitter/receiver part 138 receives the supervisory control signals of the retrieval mode from the four directions, and detects the retrieval mode in the response/retrieval mode reception detecting part 134. Then, the transmitter/receiver part 138 sets the flip-flop FF4C, so that the retrieval mode receiving direction is stored therein. Then, the vector processing part 110 (see FIG. 13) creates wavelength retrieving vectors to be sent to the next stage in each direction by calculating an AND operation on the elements of the received wavelength retrieving vectors and the inverted elements of the wavelength information vectors related to the respective directions. Then, the wavelength retrieving vectors thus created are sent via the transmitter/receiver parts 135–137 in the directions other than the receiving direction.

When a response (C/R="0") to one of the wavelength retrieving vectors is received from, for example, direction 1, the flip-flop FF1R is set so that the response receiving direction is stored therein. A response is sent via the transmitter/receiver part 138 related to direction 4 in accordance with the flip-flop FF4C in which the retrieval mode receiving direction is stored. Then, the flip-flops FF4C and FF1R are reset.

If switching is carried out along with the wavelength retrieval in that case, used wavelength information SWij-n is set which corresponds to the usable wavelength indicated by the response and which is used in the devices such as the optical cross-connect devices and the ADM devices. Thereafter, the flip-flops FF4C and FF1R can be reset. When the wavelength $\lambda 1$ is recognized, from the response, as being available, if the command sent together with the wavelength retrieving vector includes a route switching instruction, for example, when an optical signal of the wavelength $\lambda 1$ is transmitted from direction 4 to direction 1, the used wavelength information is SW41-1, and the wavelength information vector is "1 . . . ". That is, switching to the bypass route can be carried out in addition to the wavelength retrieval.

In contrast, if the command does not include the route switching instruction, only the wavelength retrieval is carried out. A command is used to indicate whether the route switching in the wavelength retrieval should be carried out. An inner flag is used to indicate the presence/absence of the above instruction. It is also possible to use a command which resets, to the initial state, all of the above inner flag and the flip-flops (inner flags) for storing the receiving directions. For example, a reset control of the inner flags can be employed in order to prevent occurrence of a malfunction after the process of the route switching.

Figure 16:
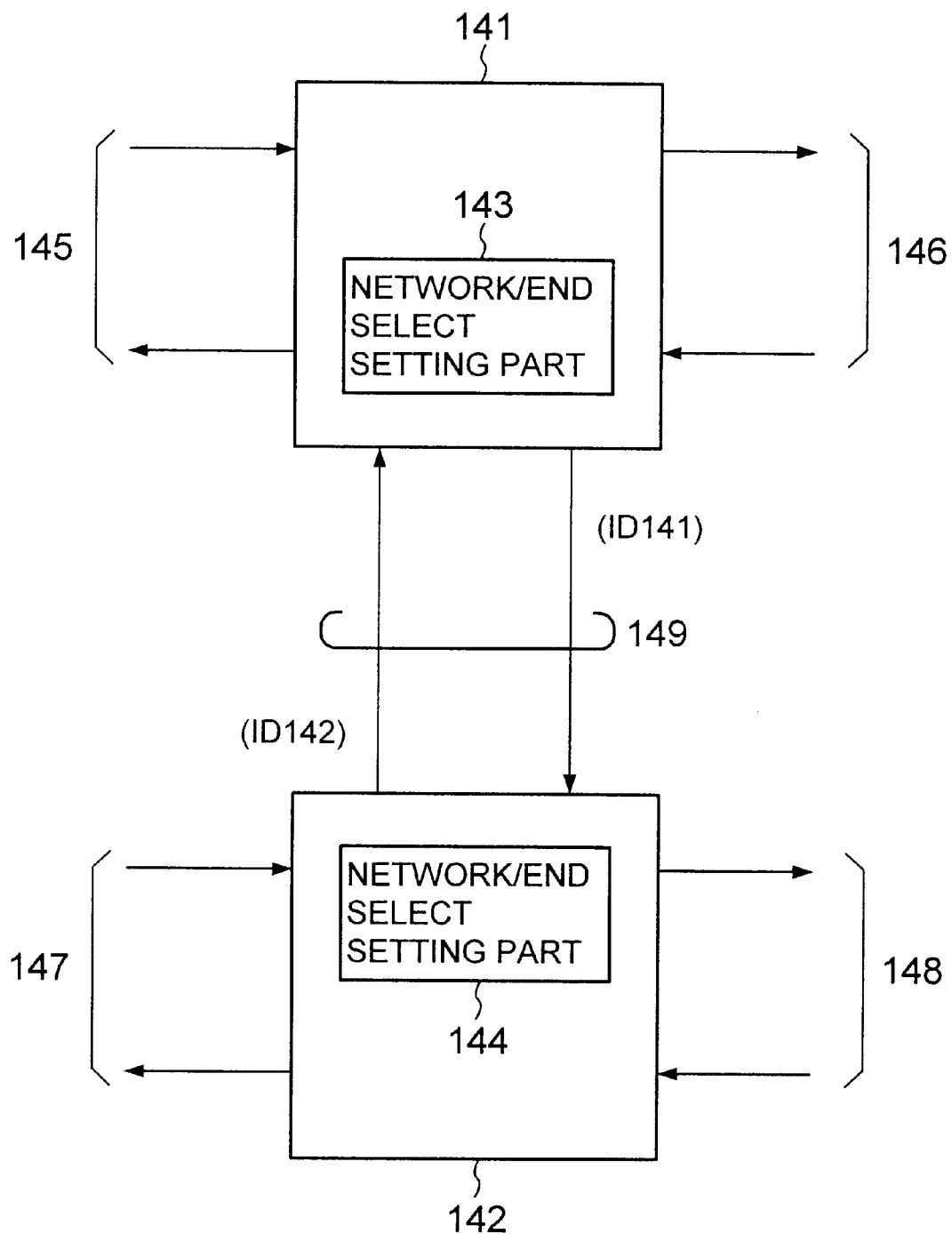
FIG. 16 is a block diagram illustrating a network/end setting.

FIG. 16 shows the network/end selection setting. The structure shown in FIG. 16 includes devices 141 and 142 such as optical cross-connect devices and the ADM devices, network/end selection setting parts 143 and 144, and lines or channels 145–149. When a data communication channel DCC is provided in the supervisory control signal, a protocol such as LAPB (Link Access Procedure Balanced) or LAPD (Link Access Procedure on the D channel). In this case, it is necessary to perform the setting of network/end.

For example, in the device 141 connected between the lines 145 and 146 or the device connected between the lines 147 and 148, the network/end setting is carried out so that the west side (W) is set to the end (terminal) side and the east side (E) is set to the network side. However, it is difficult to have the lines correspond to the east and west sides in a T-type connection arrangement and a star-type connection arrangement having more lines.

When taking into account the above, it may be considered that the device which sends a connection request to form a data link in advance of the other devices is set to the network side and the device which receives the above connection request is set to the terminal side. However, if connection requests are simultaneously sent by different devices, a data link cannot be formed. In order to avoid the above situation, it may be considered to use random-number generating means for providing times based on the random number. The connection request is sent in accordance with the timing based on the random number if the connection requests are simultaneously issued and a data link cannot be formed. However, the above arrangement has a disadvantage in that the time necessary to form the data link after the devices start up depends on the performance of generating the random numbers by the generating means provided in the respective devices. Hence, it is difficult to avoid the simultaneous connection requests with high reliability.

Thus, the ID of the supervisory control signal shown in FIG. 11 is used. For example, in FIG. 16, the ID of the device 141 is denoted as (ID141), and the ID of the device 142 is denoted as (ID142). When a data link is formed, the opposing devices 141 and 142 compare the values of the device IDs with each other and determine which one of the device ID is greater than the other. In the case shown in FIG. 16, (ID141)<(ID142) and thus the devices 141 and 142 can be set to the terminal side and the network side. Hence, the data link can definitely be formed.

In a network having a plurality of terminal devices, if the terminal devices independently perform the aforementioned wavelength retrieval and route retrieval, an error may occur. Hence, a master station is selected and the other terminals are handled as slave stations. In this case, only the master station can perform the path retrieval and route retrieval by the wavelength retrieving vectors. Alternatively, a slave station which receives an authorization from the master station performs the path retrieval and route retrieval. For example, in the structure shown in FIG. 14, when the device 122 is selected as the master station, the other devices 121 and 123–125 serve as slave stations. The device 122 manages the path retrieval and route retrieval using the wavelength retrieving vector.

There is a possibility that a fault may occur in the master station. In this case, one of the other slave stations is set to the master station. Hence, the master station periodically informs the slave stations of its normality. If the periodic notification fails, it is judged that a fault has occurred in the master station. Then, one of the slave stations is set to the master station in accordance with a predetermined sequence or a comparison between the device IDs.

FIGS. 17, 18 and 19 show operation modes and the supervisory control signals used in the embodiment of the present invention. FIG. 17 shows, as operation modes, a normal mode, path retrieval mode, route retrieval 1 mode (no switching), route retrieval 2 mode (execution of switching). The supervisory control signals (see FIG. 11) respectively corresponding to the above modes have fields shown in FIG. 17. The fields of the supervisory control signals include the mode field, C/R field, fields of code 1, vector 1, code 2, vector 2, counter field and ID field. In FIGS. 17–19, symbol X means "don't case".

In FIG. 17, in the normal mode, the four lower bits of the mode field are set to "0000", and the wavelength information field and/or the received-state vector is generated. In this case, C/R="1". That is, each of the opposing devices sends the wavelength information vector to the other and sends the other the received-state vector which is received from the other and is indicative of the wavelength.

In the path retrieval mode, a retrieval object vector (the same as the aforementioned retrieval wavelength vector) is generated in which the mode field is set "%XX00001", and C/R="1". In this case, the counter field is set to "0". A transfer of the retrieval object vector is performed as follows. A vector after the path matrix conversion is handled as a retrieval object wavelength vector. The received value of the counter field is written into code 2 and vector 2. A value obtained by incrementing the received value by +1 is written into the counter field. The received ID is written into the ID field.

A response to the retrieval object wavelength vector is as follows. C/R="1". The received retrieval object wavelength vector is written in the field of code 1 and vector 1. The received retrieval object wavelength vector (the aforementioned retrieval result object) is written into the field of code 2 and vector 2. The received value is written into the counter field. The device own ID is written into the ID field. The response thus formed is sent to the devices, which transfer the received values as they stand.

In the route retrieval 1 mode, the retrieval object wavelength vector is created in which the mode field is set to "%XX00010" and C/R="1". In this case, the counter field is set to "0", and the ID of the other party device is written into the ID field. The device that receives and transfers the supervisory control signal thus formed writes a vector obtained by converting the path matrix on the basis of the received retrieval object wavelength vector and the received received-state vector. Further, a value obtained by incrementing the received value of the counter field by +1 is written therein, and the received value of the ID field is written therein.

The device having the ID specified by the ID field sends a response such that C/R="0", and the retrieval object wavelength vector set in the field of code 1 and vector 1. Further, the received retrieval object wavelength vector is written into the field of code 2 and vector 2, and the received value is written into the counter field. The ID of the above device is written into the ID field. Each device which repeats the above response transfers the response as it stands.

The route retrieval 2 mode is a mode in which switching is performed, while the route retrieval 1 mode does not perform switching. In the route retrieval 2 mode, "%XX10010" is written into the mode field, and the other fields thereof have the same contents as those of the fields of the route retrieval 1 mode. Hence, it is possible to determine whether switching should be carried out by referring to the mode field. When switching should be performed, the switching is performed by the optical cross-connect device in accordance with the received retrieval wavelength vector.

In FIG. 18, the flag reset mode resets the flags formed by the flip-flops of the receiving direction memory part, and "%XXX0011" written into the mode field. The network/end setting mode indicates the time of forming the data link. The mode field of the network/end setting mode has "%XXX0100" which is common to the creating and response sides, and the ID field thereof has the ID of the device of interest. The mode field used when repeating and transferring is "%XXX0000", and an arbitrary value other than the ID is written into the ID field.

The retrieval request mode has the mode field in which "%XXX0101" is written. At the creating side (transmission-side terminal device), the C/R is set to "1", and the wavelength information vector and the received-stage vector are set. Further, the ID of the device of interest (transmission-side terminal device) is written into the ID field. At the time of responding to the retrieval request mode and repeating, the following supervisory control signal is sent. That is, the C/R is set to "0" and the received value, that is, the ID of the transmission-side terminal device is written into the ID field. The wavelength information vector and the received-state vector are included in the supervisory control signal.

In the reception notification mode, "%X1X0110" is written into the mode field, and "1" is written into the C/R. Further, the ID of the device of interest is written into the ID field. At the time of repeating the above supervisory control signal, the received values are transferred. In the completion notification mode, the device is notified of the completion of the setting process. A value "%X1X0111" is written into the mode field, the set values are written into the field of code 1 and vector 1 and the field of code 2 and vector 2. A maximum value, for example, "1111" is written into the counter field. The ID of the device of interest is written into the ID field. At the time of repeating, the received values are transferred.

In FIG. 19, the advanced notification mode is directed to smoothly performing the control in the optical amplifier before the number of wavelengths used is increased or decreased. The supervisory control signal of the advanced notification mode has the mode field in which "%XXX1001" is written, and "1" is written into the C/R. A wavelength accommodation state vector (the same as the aforementioned wavelength information vector) obtained after the change of the number of wavelengths is written into the field of code 1 and vector 1. The ID of the device of interest is written into the station of interest.

The master station notification mode indicates a notification transferred to the aforementioned master station to a plurality of slave stations. The supervisory control signal has the mode field in which "%XXXXXXX" is written, and the other fields in which arbitrary values are stored. The supervisory control signal of the error notification mode has the mode field in which "%1XXXXXX", and the other fields in which arbitrary values are stored. The supervisory control signal of the reception confirmation request mode has the mode field in which "%X#XXXXX" is stored and the other fields in which arbitrary values are stored.

The present invention is not limited to the specifically disclosed embodiments, and variations and modifications may be made without departing from the scope of the present invention. For example, the wavelength information vector may include the wavelength of the optical signal serving as the supervisory control signal. In this case, the element to the wavelength $\lambda s$ is always "1". If this element is "0", then it shows breakdown of the supervisory control signal. In this case, the optical amplifiers are controlled in accordance with the number of wavelengths included in the main signal used immediately before the element to the wavelength $\lambda s$ becomes "0". Hence, the main signal continues to be transmitted.

What is claimed is:

1. An optical transmission device for a wavelength division multiplexed (WDM) optical transmission system, said optical transmission device comprising:

a first part creating a supervisory control signal and transmitting the created supervisory control signal together with an optical main signal, the supervisory control signal including a vector of elements respectively corresponding to wavelengths of the WDM optical transmission system; and a second part receiving a supervisory control signal, different from the transmitted supervisory control signal, from a remote optical transmission device, the received supervisory control signal including a vector, the second part converting the vector included in the received supervisory control signal into another vector via a path matrix in which the vector included in the received supervisory control signal forms diagonal elements, said another vector being transmitted by the optical transmission device to a next stage in the WDM optical transmission system.

2. The optical transmission device as claimed in claim 1, further comprising a third part which transmits a wavelength information vector to the next stage in the WDM optical transmission system, the wavelength information vector indicating that the number of wavelengths used by the optical transmission device is zero when the transmitted supervisory control signal and the main signal are broken down.

3. The optical transmission device as claimed in claim 1, wherein:
the vector included in the transmitted supervisory control signal is a wavelength information vector which indicates the number of wavelengths used in the main signal; and
the optical transmission device or said remote optical transmission device comprises a part which determines whether there is a collision of wavelengths used by referring to wavelength information vectors received from a plurality of routes.

4. The optical transmission device as claimed in claim 1, wherein the optical transmission device receives a supervisory control signal from a transmission-side device including a vector of elements corresponding to wavelengths transmitted by the transmission-side device to the optical transmission device, the optical transmission device further comprising:
a third part which transmits a supervisory control signal to the transmission-side device including a received-state vector indicating wavelengths transmitted by the transmission-side device which were normally received by the optical transmission device.

5. The optical transmission device as claimed in claim 1, wherein the optical transmission device receives a supervisory control signal from a transmission-side device including a vector of elements corresponding to wavelengths transmitted by the transmission-side device to the optical transmission device, the optical transmission device further comprising:
a third part which transmits to the transmission-side device a supervisory control signal including a received-state vector formed by performing an OR operation on received-state vectors received from more than one route.

6. The optical transmission device as claimed in claim 1, wherein the optical transmission device receives a supervisory control signal from a transmission-side device including a vector of elements corresponding to wavelengths transmitted by the transmission-side device to the optical transmission device, the optical transmission device further comprising:
a third part which transmits to the transmission-side device a supervisory control signal including a received-state vector formed by performing an AND operation on received-state vectors received from more than one route.

7. The optical transmission device as claimed in claim 1, further comprising a third part comparing a wavelength information vector indicating wavelengths used with a received-state vector indicating wavelengths normally received, and identifying a fault from a mismatch between corresponding elements in the wavelength information vector and the received-stage vector.

8. The optical transmission device as claimed in claim 1, further comprising a transmission device which uses a supervisory control signal to transmit a wavelength retrieving vector for retrieving a usable wavelength and, in response, receives a return supervisory control signal from an optical device in the WDM optical transmission system including a retrieval result indicating a retrieved usable wavelength and a device ID.

9. The optical transmission device as claimed in claim 1, wherein the optical transmission devices uses a supervisory control signal to transmit a wavelength retrieving vector for retrieving a usable wavelength and, in response, receives a return supervisory control signal from an optical device in the WDM optical transmission system including a retrieval result indicating a retrieved usable wavelength, a device ID and a counter value indicating an order of receipt of the wavelength retrieving vector.

10. The optical transmission device as claimed in claim 1, further comprising a receiving direction memory part which stores a direction in which a wavelength retrieving vector indicating a usable wavelength is received, and a direction in which a response is received, the response being sent in receipt of a newly created wavelength information vector.

11. The optical transmission device as claimed in claim 1, further comprising
a receiving direction memory part which stores a direction in which a wavelength retrieving vector indicating a usable wavelength is received, and a direction in which a response is received, the response being sent in receipt of a newly created wavelength information vector; and
a part which resets the receiving direction memory part after the optical transmission device is controlled to use the usable wavelength in accordance with a route switching instruction.

12. The optical transmission device as claimed in claim 1, further comprising a third part which sends, by a supervisory control signal, a wavelength retrieving vector for retrieving a usable wavelength, and a route switching instruction indicating whether the usable wavelength should be used by switching.

13. The optical transmission device as claimed in claim 1, further comprising a third part which performs setting of a network side or a terminal side on the basis of a magnitude of a value of a device ID of an opposing optical transmission device at the time of establishing a data link for sending and receiving supervisory control signals.

14. An optical amplifier receiving a wavelength division multiplexed (WDM) optical signal and a supervisory signal transmitted by an optical transmission device, the supervisory signal including a wavelength information vector indicating wavelengths used by the WDM optical signal, the optical amplifier comprising:
a first part which optically amplifies the received WDM optical signal; and
an automatic level controller performing automatic level control based on the number of wavelengths indicated by the received wavelength information vector.

15. The optical amplifier as claimed in claim 14, wherein the automatic level controller performs automatic level control so that, when the supervisory control signal is broken down, automatic level control is based on a number of wavelengths used immediately before the supervisory control signal broke down.

16. The optical amplifier as claimed in claim 14, wherein the automatic level controller performs automatic level control so that, when the supervisory control signal and the WDM optical signal are broken down, automatic level control is based on a condition in which the number of wavelengths used in the WDM optical signal is equal to zero.

17. The optical amplifier as claimed in claim 14, wherein the optical amplifier comprises a part which gradually controls an output level based on an increase or decrease in the number of wavelengths used in response to a notification indicating such an increase or decrease and returns the output level to an original level based on the number of wavelengths used before said increase or decrease when a fault occurs while gradually controlling the output level, the optical amplifier being notified of the fault by the supervisory control signal.

18. A wavelength-multiplexed optical transmission system comprising:

a plurality of optical transmission devices, each of the optical transmission devices comprising a first part creating a supervisory control signal and transmitting the created supervisory control signal together with an optical main signal, the supervisory control signal including elements respectively corresponding to wavelengths of the wavelength-multiplexed optical transmission system, and a second part receiving a supervisory control signal, different from the transmitted supervisory control signal, from a remote optical transmission device, the received supervisory control signal including a vector, the second part converting the vector included in the received supervisory control signal into another vector via a path matrix in which the vector included in the received supervisory control signal forms diagonal elements, said another vector being transmitted by the optical transmission device to a next stage in the wavelength-multiplexed optical transmission system.

19. The wavelength-multiplexed optical transmission system as claimed in claim 18, wherein:

one of the optical transmission devices serves as a master station, and remaining optical transmission devices serve as slave stations;

a path retrieval or a route retrieval using a wavelength retrieving vector is carried out by the master station or one of the slave stations which is allowed to perform the path retrieval or the route retrieval by the master station; and one of the slave stations is set to a new master station if a fault occurs in the master station.

20. An apparatus comprising:

an optical transmission device comprising a transmitter creating a supervisory control signal and transmitting the created supervisory control signal together with a wavelength divisional multiplexed (WDM) optical signal to an optical transmission line of a WDM optical transmission system for transmission through the transmission line, the supervisory control signal including a vector of elements respectively corresponding to wavelengths of the WDM optical transmission system; and a receiver receiving a supervisory control signal, different from the transmitted supervisory control signal, from a remote optical transmission device, the received supervisory control signal including a vector, the receiver converting the vector included in the received supervisory control signal into another vector via a path matrix in which the vector included in the received supervisory control signal forms diagonal elements, said another vector being transmitted by the optical transmission device to a next stage in the WDM optical transmission system.

21. An apparatus as in claim 20, wherein the vector included in the supervisory control signal transmitted with the WDM optical signal is a wavelength information vector indicating the number of wavelengths used in the WDM optical signal.

22. An apparatus comprising:

an optical transmission device comprising means for creating a supervisory control signal and for transmitting the created supervisory control signal together with a wavelength divisional multiplexed (WDM) optical signal to an optical transmission line of a WDM optical transmission system for transmission through the transmission line, the supervisory control signal including a vector of elements respectively corresponding to wavelengths of the WDM optical transmission system, means for receiving a supervisory control signal, different from the transmitted supervisory control signal, from a remote optical transmission device, the received supervisory control signal including a vector, means for converting the vector included in the received supervisory control signal into another vector via a path matrix in which the vector included in the received supervisory control signal forms diagonal elements, and means for transmitting said another vector to a next stage in the WDM optical transmission system.

23. An apparatus as in claim 22, wherein the vector included in the supervisory control signal transmitted with the WDM optical signal is a wavelength information vector indicating the number of wavelengths used in the WDM optical signal.

24. A method comprising:

creating a supervisory control signal;

transmitting the created supervisory control signal together with a wavelength divisional multiplexed (WDM) optical signal to an optical transmission line of a WDM optical transmission system for transmission through the transmission line, the supervisory control signal including a vector of elements respectively corresponding to wavelengths of the WDM optical transmission system;

receiving a supervisory control signal, different from the transmitted supervisory control signal, from a remote optical transmission device, the received supervisory control signal including a vector;

converting the vector included in the received supervisory control signal into another vector via a path matrix in which the vector included in the received supervisory control signal forms diagonal elements; and transmitting said another vector to a next stage in the WDM optical transmission system.

25. A method as in claim 24, wherein the vector included in the supervisory control signal transmitted with the WDM optical signal is a wavelength information vector indicating the number of wavelengths used in the WDM optical signal.

* * * * *